United States Patent
Isaac et al.

(10) Patent No.: US 9,940,295 B2
(45) Date of Patent: Apr. 10, 2018

(54) EXTREMELY HIGH FREQUENCY SYSTEMS AND METHODS OF OPERATING THE SAME TO ESTABLISH USB DATA TRANSPORT PROTOCOLS

(71) Applicant: Keyssa, Inc., Campbell, CA (US)

(72) Inventors: Roger D. Isaac, San Jose, CA (US); Ian A. Kyles, West Linn, OR (US); Steve Novak, South Lake Tahoe, CA (US); Srikanth Gondi, Cupertino, CA (US); Sunderraj V. Palaniraj, Campbell, CA (US); Sridhar Subramanian, Campbell, CA (US)

(73) Assignee: KEYSSA, INC., Campbell, CA (US)

( * ) Notice: Subject to any disclaimer, the term of this patent is extended or adjusted under 35 U.S.C. 154(b) by 283 days.

(21) Appl. No.: 14/826,830

(22) Filed: Aug. 14, 2015

(65) Prior Publication Data

US 2017/0046299 A1 Feb. 16, 2017

(51) Int. Cl.
*G06F 13/42* (2006.01)
*G06F 13/40* (2006.01)
*G06F 13/38* (2006.01)
*H04B 1/40* (2015.01)

(52) U.S. Cl.
CPC ........ *G06F 13/4282* (2013.01); *G06F 13/385* (2013.01); *G06F 13/4068* (2013.01); *H04B 1/40* (2013.01)

(58) Field of Classification Search
CPC .............................. H04B 1/406; G06F 13/385
See application file for complete search history.

(56) References Cited

U.S. PATENT DOCUMENTS

| | | | |
|---|---|---|---|
| 6,015,093 | A | 1/2000 | Barrett et al. |
| 7,986,917 | B2 | 7/2011 | Ahlgren et al. |
| 9,559,753 | B2 | 1/2017 | McCormack et al. |
| 2006/0101298 | A1 | 5/2006 | Park et al. |
| 2008/0008159 | A1 | 1/2008 | Bourlas et al. |
| 2009/0009337 | A1 | 1/2009 | Rofougaran |
| 2009/0037628 | A1 | 2/2009 | Rofougaran |
| 2009/0098826 | A1 | 4/2009 | Zack et al. |
| 2009/0257445 | A1 | 10/2009 | Chan et al. |
| 2010/0314445 | A1 | 12/2010 | Kargl et al. |
| 2011/0026643 | A1 | 2/2011 | Ruelke et al. |

(Continued)

FOREIGN PATENT DOCUMENTS

| | | |
|---|---|---|
| CN | 101087172 A | 12/2007 |
| CN | 101685631 B | 3/2010 |

(Continued)

*Primary Examiner* — Farley Abad
(74) *Attorney, Agent, or Firm* — Van Court & Aldridge LLP

(57) ABSTRACT

EHF communication systems described herein can selectively implement any one of the USB standards by mapping appropriate USB signal conditions over an EHF contactless communication link. The EHF contactless communication link may serve as an alternative to conventional board-to-board and device-to-device connectors, and as such enables wired connection USB signaling protocols to be used in a non-wired environment provided by the EHF contactless communications link. Use of a USB protocol over the EHF communications link can be accomplished by establishing the EHF link between counterpart EHF communication units, and then by establishing the appropriate USB protocol over the link.

32 Claims, 32 Drawing Sheets

(56) References Cited

U.S. PATENT DOCUMENTS

| | | |
|---|---|---|
| 2012/0120989 A1 | 5/2012 | Toriyama et al. |
| 2012/0263244 A1 | 10/2012 | Kyles et al. |
| 2012/0295539 A1 | 11/2012 | McCormack et al. |
| 2012/0307932 A1 | 12/2012 | McCormack et al. |
| 2013/0070616 A1 | 3/2013 | Lee et al. |
| 2013/0217336 A1 | 8/2013 | McCormack et al. |
| 2014/0248801 A1 | 9/2014 | Riezebos et al. |
| 2014/0273856 A1 | 9/2014 | Kyles et al. |
| 2017/0127465 A1 | 5/2017 | McCormack et al. |

FOREIGN PATENT DOCUMENTS

| | | |
|---|---|---|
| CN | 102467648 B | 5/2012 |
| KR | 10-2011-0128730 A | 11/2011 |
| WO | 2011/149253 A3 | 12/2011 |
| WO | 2013/053714 A1 | 4/2013 |
| WO | 2013/130486 | 9/2013 |

| Received OpMode | Local OpMode | Result |
|---|---|---|
| USB3 | USB3 | Valid |
| USB3 | USB2 | Invalid |
| USB3 | USB 3/2 Auto | Valid |
| USB2 | USB3 | Invalid |
| USB2 | USB2 | Valid |
| USB2 | USB 3/2 Auto | Valid |
| USB 3/2 Auto | USB3 | Valid |
| USB 3/2 Auto | USB2 | Valid |
| USB 3/2 Auto | USB 3/2 Auto | Valid |

FIG. 11

| ID state | PIN Value @ Attentive | PIN Value @ Cap Mx | CapMsg USB Function |
|---|---|---|---|
| Host Only | 0 | X | 00 |
| Device Only | 1 | X | 01 |
| OTG (Host) | float | 0 or float | 10 |
| OTG (device) | float | 1 | 11 |

FIG. 12

| Received Code | Local Code | Action |
| --- | --- | --- |
| 00 | 00 | Invalid; Fail out of Capabilties Message State |
| 00 | 01 | Valid; Advance to next State |
| 00 | 10 | Valid; Drive Configuration Pin to '1'; Advance to next State |
| 00 | 11 | Valid; Drive Configuration Pin to '1'; Advance to next State |
| 01 | 00 | Valid; Advance to next State |
| 01 | 01 | Invalid; Fail out of Capabilties Message State |
| 01 | 10 | Valid; Drive Configuration Pin to '0'; Advance to next State |
| 01 | 11 | Valid; Drive Configuration Pin to '0'; Advance to next State |
| 10 | 00 | Valid; Advance to next State |
| 10 | 01 | Valid; Advance to next State |
| 10 | 10 | Valid; Drive Configuration Pin to '1'; Advance to next State |
| 10 | 11 | Valid; Drive Configuration Pin to '1'; Advance to next State |
| 11 | 00 | Valid; Advance to next State |
| 11 | 01 | Valid; Advance to next State |
| 11 | 10 | Valid; Drive Configuration Pin to '0'; Advance to next State |
| 11 | 11 | Invalid; Fail out of Capabilties Message State |

FIG. 13

| Host Rx, Tx Mode | Device Rx, Tx Mode | USB Mode Resolution | Actions Required to Achieve Resolution |
|---|---|---|---|
| 3 only | 3 only | USB3 | Regular EHF CapMsg handling (e.g., FIG. 18) |
| 3 only | 2 only | Fail out | Regular EHF CapMsg handling (e.g., FIG. 18) |
| 2 only | 3 only | Fail out | Regular EHF CapMsg handling (e.g., FIG. 18) |
| 2 only | 2 only | USB2 | Regular EHF CapMsg handling (e.g., FIG. 18) |
| USB 3/2 | 3 only | USB3 or Fail | Host to lock in at USB3 if Rx detect operation passes or Fail if detect operations fail |
| USB 3/2 | 2 only | USB2 | Host lock in at USB2 |
| 3 only | USB 3/2 | USB3 or Fail | Device lock in to USB3 if Rx detect operation passes or Fail if detect operations fail |
| 2 only | USB 3/2 | USB2 | Device lock in at USB2 |
| USB 3/2 | USB 3/2 | USB3 or USB2 if USB3 Fails out | Host & Device lock in at USB3 if both Rx detect operations pass; or USB2 if either detect operations fail |

FIG. 19A

| Type of CP5 signal received at Tx | Capabilities advertised in CapMsg state | Data Transport Mode entered |
|---|---|---|
| Standard CP5 pulse | USB 3/2 | USB 3 |
| 2x CP5 pulse | USB 3 | USB 3 |
| 4x CP5 pulse | USB 2 only | USB 2 |

FIG. 19B

| EHF Rx USB Capability | USB Capabilities received by Rx in CapMsg | Action | Result |
|---|---|---|---|
| USB 3/2 Auto | USB 3/2 Auto | Perform Rx detect on HS IO | If Rx detect pass, select USB 3; Send 2x CP5 pulse to Tx |
| | | | If Rx detect fails: wait a programmable time, perform Rx detect again. |
| | | | If Rx detect pass, select USB 3; Send 2x CP5 pulse to Tx |
| | | | If Rx detect fails a second time, select USB 2 |
| USB 3/2 Auto | USB 3 | Perform Rx detect on HS IO | If Rx detect pass, select USB 3; Send 2x CP5 pulse to Tx |
| | | | If Rx detect fails: wait a programmable time, perform Rx detect again. |
| | | | If Rx detect pass, select USB 3; Send 2x CP5 pulse to Tx |
| | | | If Rx detect fails a second time, connection attempt is aborted |
| USB 3/2 Auto | USB 2 | Select USB 2; Send 4x CP5 pulse to Tx | Select USB 2, send 4x CP5 pulse to Tx |

FIG. 19C

|  | UPTX State | DNRX State | DNTX State | UPRX State | Condition(s) and Actions(s) |
|---|---|---|---|---|---|
| 2202 | Wake | Wake | Wake | Wake |  |
| 2204 |  |  | DPLUS |  | One of the Tx configured units detects a D+ on its USB port; Sends a 0 on its EHF link |
| 2206 |  |  |  | DPLUS | If Receives EHF0 and SE0 on its USB port, a) Becomes UPRX b) Sets CP5=1 |
| 2208 | DPLUS |  |  |  | If sees CP5=1 and a SE0 on its USB port, a) becomes a UPTX, b) Sends EHF0 |
| 2210 |  | DPLUS |  |  | If receives EHF0 with its USB port at D+, a) becomes DNRX, b) Sets CP5=1 ; All 4 units are in DPLUS state |
| 2212 |  |  | DPLUSCONF_1 |  | DNTX sees CP5=1; transitions state and sends EHF1 |
| 2214 |  |  |  | DPLUSCONF_2 | UPRX receives EHF1; transitions state; sets CP5=0 |
| 2216 | DPLUSCONF_3 |  |  |  | UPTX sees CP5=0; transitions state; sends EHF1 |

| | UPTX State | DNRX State | DNTX State | UPRX State | Condition(s) and Actions(s) |
|---|---|---|---|---|---|
| 2218 | | DPLUSCONF_4 | | | DNRX receives EHF1; transitions state; All 4 EHF units are on DPLUSCONF state and each have identified appropriate upstream or downstream position in the EHF Loop for the USB link; UPRX enables D+ on its USB line to make connection visible to USB Host and initiate USB signalling- |
| 2220 | Determine whether to begin a full speed mode negotiation or high speed mode negotiation | | | | |
| 2222 | FSPEEDsrc_1 | | | | UPTX first moves to FSPEED state; It assumes that first SOP will originate from a USB host; When FS USB host sends a K, UPTX transmits a 0 on EHF carrier; |

FIG. 22B

| | UPTX State | DNRX State | DNTX State | UPRX State | Condition(s) and Actions(s) |
|---|---|---|---|---|---|
| 2224 | | On ehf0 at start of SOP -><br><br>FSPEEDsnk_2 | | | When DNRX receives EHF0 at start of FS SOP, it transitions, sets CP5=1; transmit K; all future transitions on EHF will be transmitted asynchronously on USB port (Data Transport state of POC) |
| 2226 | | | FSPEEDsnk_3 | | When DNTX detects the K on its USB lines in conjunction with CP5=1, it will move to FSPEED; DNTX transmits a 0 on EHF carrier; State of CP5 is required for determining whether SOP was initiated by USB host or device |
| 2228 | | | | FSPEEDsrc_4 | After the K char of FS SOP has been propagated around the EHF loop, UPRX detects EHF0, transitions state, sets CP5=1 to complete the loop for UPTX. |
| 2229 | Proceed to step 2230 if SE0 received, or proceed to step 2238 if J received. | | | | |

FIG. 22C

|  | UPTX State | DNRX State | DNTX State | UPRX State | Condition(s) and Actions(s) |
|---|---|---|---|---|---|
| 2230 | EOP1src_1 |  |  |  | When UPTX detects SE0 in the FS EOP, transitions to EOPsrc state, and transmits the SE0; It is still transmitting USB data on to EHF link; SE0 is represented by EHF idle. |
| 2232 |  | EOP1snk_2 |  |  | When DNRX receives Idle on EHF port (indicates FS EOP on host side) will propagate SE0 on USB port and transition state; switches CP5=0 |
| 2234 |  |  | EOP1_snk3 |  | When DNTX detects CP5=0 and receives SE0, switches to this state; Sets EHF idle, confirms to UPRX that SE0 is active on downstream side |
| 2236 |  |  |  | EOP1src_4 | When UPRX receives confirmation from the DNTX it is in EOP1snk_2 state, transitions to EOP1src_4 state, sets CP5=1 |
| 2238 | EOP2src_1 | EOP2_snk2 |  |  | When UPTX detects a J symbol in the EOP, and sees CP5=1 from UPRX, transitions to this state; still muxing |

FIG. 22D

| | UPTX State | DNRX State | DNTX State | UPRX State | Condition(s) and Actions(s) |
|---|---|---|---|---|---|
| | | | | | USB state onto EHF asynchronously. This propagates as EHF1 to DNRX which switches its state, and sets CP5=1 |
| 2140 | | | EOP2_snk3 | EOP2src_4 | When DNTX sees CP5=1, switches state, sends an EHF1 to UPRX to enable completion of the loop for the EOP 2 state; When UPRX receives ehf1, switches state and sets CP5=0; |
| 2142 | FULLIDLE_1 | | | | Soon as UPTX device detects CP5=0 (confirmation from UPRX that DNTX is driving a J), it switches to this state (Since FS Idle is same as DPLUS state, its impossible to know when the host device has released the USB bus, and relies on the DPLUS resistor to pull up the D+ line). In this state, USB data no longer sourced from EHF signal, and is forced to EHF Idle |
| 2144 | | FULLIDLE_2 | FULLIDLE_3 | FULLIDLE_4 | The FULLIDLE state propagates around the loop through DNRX, DNTX, UPRX in that order. [UPRX device maintains its D pull-up resistor to hold the upstream USB port in FS Idle state.] |
| 2146 | FSPEEDsrc_1 or FSPEEDsnk_3 | FSPEEDsnk_2 or FSPEEDsrc_4 | FSPEEDsnk_3 or FSPEEDsrc_1 | FSPEEDsrc_4 or FSPEEDsnk_2 | |
| 2150 | DPLUSCONF -> HSPOLL_1 | DPLUSCONF -> HSPOLL_2 | DPLUSCONF -> HSPOLL_3 | DPLUSCONF -> HSPOLL_4 | If UPTX in DPLUSCONF state detects a SE0 driven by the Host (by enabling high-speed termination on its links) and CP5=0, transitions to HighSpeed POLL (HSPOLL) state; Signals other EHF devices in the loop to transition to HSPOLL state. DNRx also established high speed termination on its links |
| 2152 | HSPOLL_1 -> | HSPOLL_2 -> | HSPOLL_3 -> | HSPOLL_4 -> | Once all the EHF units are in the |

FIG. 22E

|  | UPTX State | DNRX State | DNTX State | UPRX State | Condition(s) and Actions(s) |
|---|---|---|---|---|---|
|  |  |  |  |  | HSPoll state and SE0 has propagated around the USB EHF loop, all the EHF units transition to SE0CONF state |
| 2253 | Proceed to step 2254 if USB device responds with a ChripK before USB host times out, else proceed to step 2222. | | | | |
| 2254 | CHIRPK_3 | CHIRPK_4 | SE0CONF-><br>CHIRPK_1 | CHIRPK_2 | When ChirpK is detected on device side, DNTX first transitions to CHIRPK state and signals other EHF units to transition to CHIRPK states. UPRX repeats the ChirpK on the USB host side of EHF link. Once all state machines have transitioned to CHIRPK, they wait for USB device to remove the ChirpK signal |
| 2256 | NOCHIRPK_7 | NOCHIRPK_8 | NOCHIRPK_1-><br>NOCHIRPK_5 | NOCHIRPK_6 | All EHF USB state machines next transition to the second NOCHIRPK state, preparing the EHF link for detecting the next transition originating on the USB host side Vs the USB device side. Otherwise, the state of the USB link does not change |

FIG. 22F

| | UPTX State | DNRX State | DNTX State | UPRX State | Condition(s) and Actions(s) |
|---|---|---|---|---|---|
| 2258 | CHIRPJK_1 | CHIRPJK_2 | CHIRPJK_3 | CHIRPJK_4 | USB host will now drive alternating ChirpJ and ChirpK. When ChirpJ is detected on USB host side, UPTX first transitions to CHIRPJK state and signals other EHF units to transition to CHIRPJK states. In this state, EHF link from UPTX to the DNRX is multiplexed asynchronously to avoid jitter due to sampling the signal. |
| 2260 | HSIDLE | HSIDLE | HSIDLE | HSIDLE | Once all the EHF units are in the CHIRPJK state, they wait for the SE0 signal which indicates negotiation is complete at which point they transition to the HSIDLE state in a progressive loop In HSIDLE, DNRX unit applies |

FIG. 22G

|  | UPTX State | DNRX State | DNTX State | UPRX State | Condition(s) and Actions(s) |
|---|---|---|---|---|---|
|  |  |  |  |  | IF UPTX detects a K on its USB port pulldown resistors on its USB link to maintain the state. UPTX and DNTX devices are in a high-impedance state.<br>If UPTX detects a K on its USB port with CP5=0, then it transitions to HSPEEDsrc_1. |
| 2262 | HSPEEDsrc_1 or HSPEEDsnk_3 | HSPEEDsnk_2 or HSPEEDsrc_4 | HSPEEDsnk_3 or HSPEEDsrc_1 | HSPEEDsrc_4 or HSPEEDsnk_2 | If UPTX detects a K on its USB port with CP5=0, then it transitions to HSPEEDsrc_1. The remaining USB EHF units transition to HSPEEDsrc/snk states progressively as illustrated for FSPEEDsrc and FSPEEDsnk states. If DNTX detects a K with CP5=0, then it transitions to HSPEEDsrc_1 state first, and remaining USB EHF units transition states progressively around the EHF loop |

FIG. 22H

| | UPTX State | DNRX State | DNTX State | UPRX State | Condition(s) and Actions(s) |
|---|---|---|---|---|---|
| 2270 | HSIDLE> FSDPLUS_1 | FSDPLUS_2 | FSDPLUS_3 | FSDPLUS_4 | UPTX device detects the J on the USB link (due to pull-up of UPRX after USB host turns off its buffer asserting SE0), and transitions to FSDPLUS_1 state, and sends a ehf1 on the EHF link. DNRX sees ehf1 with the USB link at SE0 and moves to FSDPLUS_2 state from HSIDLE. This sets conditions (CPS=0 or 1 <?> driven by DNRX) for DNTX to transition to FSDPLUS_3 state (after a period of persistent SE0, the USB device will also remove its FS driver(disable output)and enable the D+ pullup) . DNTX now sends a ehf1, that is seen by the UPRX which transitions to FSDPLUS_4 and completes the EHF loop for this state transition. |
| 2272 | HSRESET_3 | HSRESET_4 | HSIDLE> HSRESET_1 | HSRESET_2 | If instead, USB host maintains a SE0 on its link, all EHF units continue to |

FIG. 22I

| | UPTX State | DNRX State | DNTX State | UPRX State | Condition(s) and Actions(s) |
|---|---|---|---|---|---|
| | | | | | be in HSIDLE state. Eventually, USB device will assert a ChirpK to start speed negotiation. DNTX will detect a ChirpK without change in CP5 state and move to HSRESET_1 state. This triggers the conditions for all of the other EHF units to move to the HSRESET state |
| 2274 | FSDPLUS_1-> SUSPEND_1 | SUSPEND_2 | SUSPEND_3 | SUSPEND_4 | After UPRX transitions to FSDPLUS_4, it switches the polarity of CP5 state. On detecting this (USB idle & CP5=1), UPTX transitions to the SUSPEND_1 state and sends a EHF idle, causing DNRX to transition to SUSPEND from FSDPLUS state. The state transiton then progresses around the loop. When DNTX moves to USB SUSPEND state, sets EHF link to idle state. Thus, in the SUSPEND state, the EHF transmitter is taken to a low power state. |

FIG. 22J

| | UPTX State | DNRX State | DNTX State | UPRX State | Condition(s) and Actions(s) |
|---|---|---|---|---|---|
| 2276 | HSRESET_3 | HSRESET_4 | HSIDLE HSRESET_1 | HSRESET_2 | When USB host forces SE0 long enough using highspeed termination, USB device will acknowledge the USB Reset, by sending a ChirpK that starts the high speed negotiation. DNTX responds to ChirpK by moving to HSRESET state first and sends a ehf1 to UPRX, which will move to HSRESET_2 state since USB link on its side is still in SE0, and assert a ChirpK on the USB link. UPTX acknowledges the ChirpK and moves to HSRESET_3 state, and sends a ehf1 to DNRX. DNRX sees the ehf1 and the ChirpK on its USB link and moves to HSRESET_4 and changes the state of CPS pin. |
| 2278 | CHIRPK_3 | CHIRPK_4 | HSRESET | CHIRPK_2 | DNTX sees the change in CPS state |

FIG. 22K

| | UPTX State | DNRX State | DNTX State | UPRX State | Condition(s) and Actions(s) |
|---|---|---|---|---|---|
| | | | CHIRPK_1 | | and moves to CHIRPK state first. This progresses around the loop to bring all the EHF units to CHIRPK state. Once all four EHF units are in CHIRPK state, speed negotiation can continue as illustrated earlier. |
| 2280 | HSPEEDsnk_11 | HSPEEDsrc_12 | HSIDLE-> HSPEEDsrc_9 | HSPEEDsnk_10 | From HSIDLE, once a K is detected by either of the EHF Tx units, the Tx that first detects a K moves to the HSPEED_src state first. However, when UPTX first detects a K when CP5=0, it saves the state until state machine transfers to HSPEEDsrc_9 or HSPEEDsrc_12. |

FIG. 22L

EXTREMELY HIGH FREQUENCY SYSTEMS AND METHODS OF OPERATING THE SAME TO ESTABLISH USB DATA TRANSPORT PROTOCOLS

FIELD OF THE INVENTION

The present disclosure relates to extremely high frequency ("EHF") systems and methods for the use thereof, and more particularly to establishing Universal Serial Bus ("USB") data transport protocols in a contactless communications system.

BACKGROUND

Electronic devices can be "connected" together to enable data transfer between the devices. Typically, the connection between the two devices can be a cabled connection or a wireless connection. A cabled connection such as USB is typically point-to-point, and requires mechanical connectors at each device, and a cable between the devices. A wireless connection such as WiFi or Bluetooth can operate in a "broadcast" mode, where one device can communicate simultaneously with several other devices, over a radio frequency ("RF") link, typically in the range of 700 MHz-5.8 GHz. Further, the protocol of interfaces such as USB can also be transported over wireless connections or over links such as wireless USB. Regardless of whether the connection is a cabled connection or a wireless connection, a link needs to be established in order to permit transfer of data to, from, and/or between devices. In establishment of these links, host software goes through a discovery process, identifying the peripheral devices 'connected' in the system and establishing communication with them.

BRIEF SUMMARY

Embodiments discussed herein refer to systems, methods, and circuits for establishing EHF contactless communications links. The embodiments further describe the establishment of contactless communication links for interfaces such as USB without intervention from host processors. Further, these contactless communication links establish and operate at a power level much lower than other standard methods employed in cabled or wireless communication. The EHF contactless communication link may serve as an alternative to conventional board-to-board and device-to-device connectors. The link may be a low-latency protocol-transparent communication link capable of supporting a range of data rates. The link may be established through close proximity coupling between devices, each including at least one EHF communication unit. Each EHF unit may progress through a series of steps before data can be transferred between the devices. These steps may be controlled by one or more state machines that are being implemented in each EHF communication unit. The state machine(s) may be referred to herein as progression of consciousness ("POC") state machine(s). Each EHF communication unit may implement its own POC state machine in order to establish a link with a counterpart unit. For example, if one EHF communication unit is functioning as a transmitter unit, its counterpart unit may be a receiver unit. The POC state machines in the EHF units may collaborate to progressively transition their respective state machines through a plurality of states before one or more contactless communication links are established.

The EHF communication units may further implement state machines appropriate to the interfaces they are implementing, hereinafter referred to as the USB Progressive Interface ("PI") state machines. These interface state machines may collaborate to progressively transition their respective state machines through a plurality of states, in accordance with the protocol of the interfaces they are implementing. These progressive state machines may be implemented as part of the POC state machine or independently of the POC state machine. There are several embodiments of these interface state machines including but not limited to interface protocols such as USB 2.0, USB 3.0, USB 3/2 Auto switchable protocols and USB On-The-Go (OTG) protocol. Other industry implementations of interfaces such as USB and DP over other wireless communication links such as Wireless-USB (USB over RF links) or Wi-Fi Direct (for DP) require a higher level of intervention from the host processors imposing additional layering of driver software in the industry standard kernel stack such as iOS, Android, Windows, etc. This can significantly increase the effort required for adoption of such implementations, compared to the implementation of those peripheral interfaces using embodiments described herein.

Another difference in implementing industry standard peripheral interfaces such as USB over contactless EHF communication links utilizing the methods described in this document is the fact that the operating power of the system described herein is significantly lower than that required in conventional implementations.

A further understanding of the nature and advantages of the embodiments discussed herein may be realized by reference to the remaining portions of the specification and the drawings.

BRIEF DESCRIPTION OF THE DRAWINGS

FIG. 11 shows an illustrative table showing which USB modes validly work together and which do not, according to an embodiment;

FIG. 12 shows an illustrative lookup table that may be accessed to compute the local code, according to an embodiment.

FIG. 13 shows illustrative actions that may be taken based on comparisons of the received code and the local code, according to an embodiment;

FIG. 19A shows a table illustrating USB mode resolution based on USB controller modes of a USB host and a USB device that communicate with each over a contactless EHF link, according to an embodiment;

FIG. 19B shows a table illustrating which USB mode a Tx selects based on the type of signal received on at least one CP5 pin, according to an embodiment;

FIG. 19C shows an illustrative table describing the actions taken by a USB EHF Rx unit in the process of resolving the USB operating mode between a USB 3.0 and a USB 2.0 mode, according to an embodiment;

FIG. 22 shows an illustration defining how FIGS. 22A-FIG. 22L should be read, according to an embodiment; and FIGS. 22A-22L show a table illustrating how a USB 2.0 PI state machine is implemented to enable USB 2.0 data transport according to an embodiment.

DETAILED DESCRIPTION

Figure 1:
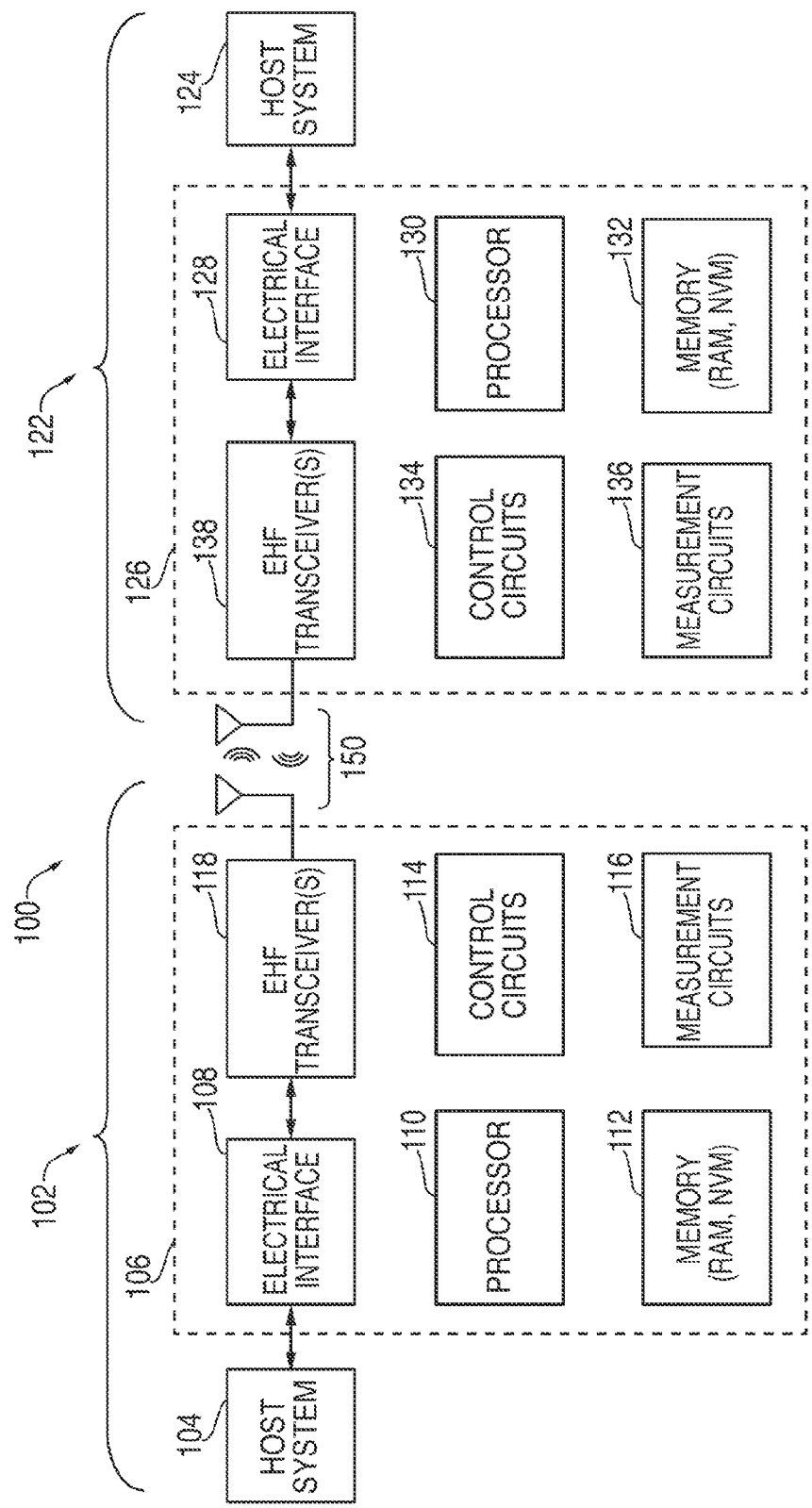
FIG. 1 illustrates a communications system, according to an embodiment.

Illustrative embodiments are now described more fully hereinafter with reference to the accompanying drawings, in which representative examples are shown. Indeed, the disclosed communication system and method may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices is important to their operation. In order to provide improved secure high-bandwidth communications, the unique capabilities of wireless communication between electronic devices and between sub-circuits within each device may be utilized in innovative and useful arrangements.

Such communication may occur between RF communication units, and communication at very close distances may be achieved using EHF frequencies (typically, 30-300 GHz) in an EHF communication unit. An example of an EHF communications unit is an EHF comm-link chip. Throughout this disclosure, the terms comm-link chip, and comm-link chip package are used to refer to EHF antennas embedded in IC packages. Comm-link chips are an example of a communication device, also referred to as communication unit, whether or not they provide wireless communication and whether or not they operate in the EHF frequency band.

The term "transceiver" may refer to a device such as an integrated circuit ("IC") including a transmitter ("Tx") and a receiver ("Rx") so that the integrated circuit may be used to both transmit and receive information, such as data. Generally, a transceiver may be operable in a half-duplex mode (alternating between transmitting and receiving), a full-duplex mode (transmitting and receiving simultaneously), or configured as either a Tx or a Rx. A transceiver may include separate integrated circuits for transmit and receive functions. The terms "contactless," "coupled pair," and "close proximity coupling" as used herein, refer to the implementing electromagnetic rather than electrical (wired, contact-based) connections and transport of signals between entities (such as devices). As used herein, the term "contactless" may refer to a carrier-assisted, dielectric coupling system which may have an optimal range in the zero to five centimeter range. The connection may be validated by proximity of one device to a second device. Multiple contactless transmitters and receivers may occupy a small space. A contactless link established with electromagnetics may be point-to point in contrast with a wireless link which typically broadcasts to several points.

The RF energy output by the EHF transceivers described herein may be designed to adhere to various requirements mandated by one or more governments or their agencies. For example, the FCC may promulgate requirements for certification for transmitting data in a RF frequency band.

"Standards" and related terms such as "Standards-based", "Standards-based interfaces", "Standards-based protocol", and the like may refer to wired interface standards which may include but are not limited to USB (e.g., USB 2.0. USB 3.0, USB 3/2, or USB OTG), DisplayPort ("DP"), Thunderbolt, HDMI, SATA/SAS, PCIe, Ethernet SGMII, Hypertransport, Quickpath, I2S, GPIO, I2C and their extensions or revisions.

EHF communication systems described herein can selectively implement any one of the USB standards by mapping appropriate USB signal conditions over an EHF contactless communication link. The EHF contactless communication link may serve as an alternative to conventional board-to-board and device-to-device connectors, and as such enables wired connection USB signaling protocols to be used in a non-wired environment provided by the EHF contactless communications link. Use of a USB protocol over the EHF communications link can be accomplished by establishing the EHF link between counterpart EHF communication units, and then by establishing the appropriate USB protocol over the link. The link may be established by having each EHF unit progress through a series of steps controlled by one or more state machines that are being implemented in each EHF communication unit. The state machine(s) may be referred to herein as progression of consciousness ("POC") state machine(s), which are discussed in greater detail below, principally in connection with the description associated with FIG. 4. Establishment of the USB signaling protocol over the link can be performed by implementing a state machine appropriate to the desired USB interface. This interface state machine may be referred to herein as a PI state machine, and may be implemented within the POC state machine or it may be implemented independent of it. As explained in more detail below, the PI state machine of an EHF communication unit may collaborate with PI state machines in other EHF communication units to progressively transition through its states as it establishes the interface (e.g., USB interface) over the established EHF link. In some embodiments, the PI state machine may be executed as part of one of the states of the POC state machine.

The communication system presented herein can consume much less power with a lot less complexity and cost than existing solutions. Maximizing bandwidth usage around a common carrier frequency requires the use of multiple communication units, each of them operating as either a transmitter or a receiver at a certain period of time. Each of the units can operate in either full duplex mode or half duplex mode with the same carrier. In some instances, the use of the same carrier (or substantially similar carrier frequency) for different communication units in the same system requires spatial separation of the communication units. In order for the communication units in the system to communicate efficiently and effectively with a partner system they must be able to synchronize their operations (and/or states). The communication units in the same system may communicate control information regarding the status or state using electrical signaling, while these same units may communicate with partner communication units (in a different system) through EHF signaling. Based on the requirements of a particular system, a specific communication unit may be powered up, based on a request from the host system, and this communication unit may be responsible for initiating link enablement of the communication unit(s) in the same system and/or in the partner system. The communication units may need to pass through multiple states, where the state transitions may partly depend on the state of one or more of the other communication units. This requires synchronization of the states in all communication units. In order to achieve this, the control information may pass through the communication units in a closed loop. In addition, data from a host system that is communicated through the communication units must be communicated transparently with little or no intervention from the host system. That is, even though EHF links are inserted between a USB host and a USB device, the link is not "visible" to the host or device. In effect, the communication units can function as USB re-drivers that have no affect on the end-to-end functionality of the USB system. Control information communicated between the EHF communication units over an EHF link may use similar signaling characteristics as data information that is communicated between two host systems over the EHF link. For example, the control information may be sent over an EHF carrier with a modulation scheme that may be similar to the modulation scheme when data information between two host systems over the EHF link.

There are several key advantages to the communication system presented herein. By physically separating communication units in the same system and optimizing the connection distance for contactless communication, the communication units can operate over the same EHF frequency with minimal interference through spatial separation. The communication units may be simpler in design because many of the constraints from a typical wireless system (for example, using multiple bands of frequencies for communication) have been relaxed or altogether removed. For example, due to the close communication distance and minimal interference with neighboring units, the units can be designed to communicate with simple modulation of the EHF signal and no additional error detection or correction circuitry. In addition, an EHF transmit unit may be physically identical (the same silicon mask set) to an EHF receive unit and a single chip may be configured as a transmitter, a receiver, or may alternately be programmed to be either a transmitter or a receiver. By using a very similar design for all the communication units, development and implementation costs may be reduced.

Various PI interface embodiments are discussed in more detail in connection with the description accompanying FIGS. 18-22. These PI state machine embodiments can enable interface protocols including, but not limited to USB 2.0, USB 3.0, and USB 3/2 Auto switchable protocols to be used in connection with the EHF contactless communication system. Thus, although the EHF contactless communication system provides a non-wired, near field link, the interface protocols behave in the same manner as a system that uses a wired, physical link. This advantageously eliminates the need to use higher level intervention from host processors that impose additional layering of driver software in industry standard kernel stacks (e.g., iOS, Android, Windows) in order to establish a USB interface. Thus, conventional industry implementations, which require the higher level intervention, and which use interfaces such as USB and DP over wireless communication links such as Wireless-USB (USB over RF links) or Wi-Fi Direct (for DP) require significant engineering effort in order to adopt such implementations and require greater power consumption compared to the implementation of the same peripheral interfaces using embodiments described herein.

For example, a CCTU in a first USB device for use in establishing a contactless communications link with a first CCRU that is associated with a second USB device and for use in communicating with a second CCRU via at least one wired path is provided. The CCTU can include several pins, wherein at least a first pin is used to communicate with the second CCRU via a wired path and at least a second pin is used to communicate with a first USB device, a transducer for transmitting EHF contactless signals to the first CCRU, and circuitry. The circuitry can be operative to execute a CCTU state machine that tracks a state of the CCTU during the establishment of the contactless communications link, wherein the state machine transitions through a plurality of states in response to signals received by the first pin, wherein one of the plurality of states comprises a capabilities state for determining a data transfer protocol. The circuitry can execute a USB state machine during the capabilities state to enable the first USB device to establish a USB connection with the second USB device via the contactless communication link, wherein the USB state machine transitions through a plurality of USB states in response to signals received by the at least a first pin and the at least a second pin. The circuitry can selectively transmit EHF signals, using the transducer, in response to a state transition in at least one of the CCTU state machine and the USB state machine.

As another example, a CCRU for use in establishing a contactless communications link with a first CCTU and for use in communicating with at least a second CCTU via at least one wired path is provided. The CCRU can include several pins, wherein at least a first pin is used to communicate with the second CCTU via a wired path and at least a second pin is used to communicate with a first USB device, a transducer for receiving EHF contactless signals from the first CCTU, and circuitry. The circuitry can be operative to execute a CCRU state machine that tracks the state of the CCRU during the establishment of the contactless communications link, wherein the state machine transitions through a plurality of states in response to signals received by the transducer, wherein one of the plurality of states comprises a capabilities state for determining a data transfer protocol. The circuitry can execute a USB state machine during the capabilities state to establish a USB connection with a second USB device associated with the first CCTU, wherein the USB state machine transitions through a plurality of USB states in response to signals received by the transducer. The circuitry can selectively drive a signal on the first pin used to communicate with the second CCTU in response to a state transition in at least one of the CCRU state machine and the USB state machine.

The Tx and Rx units can also resolve which USB mode to used. For example, in one embodiment a method for resolving a USB mode for use by a CCRU is provided. The method can include receiving a capabilities message from a first CCTU over a contactless communications link, wherein the message comprises first CCTU USB parameters, retrieving CCRU USB parameters from the CCRU, comparing the CCTU USB and CCRU USB parameters to resolve which one of a plurality of USB modes the CCRU should use, and selecting a USB mode based on the resolution.

As another embodiment, a method for resolving a USB mode for use by a CCTU is provided. The method can include receiving a signal from a first CCRU via at least one wired path on at least a first pin, wherein the signal specifies one of a first CCRU USB capable parameter and a first CCRU USB resolved parameter, transmitting a CCTU USB parameter to a second CCRU over a contactless communications link, wherein the transmitted CCTU USB parameter is based on the received signal from the first CCRU, and selecting a first USB mode based on the received signal.

The EHF communications units described herein differ from conventional EHF technologies in that any data that is transmitted from one CCU to another CCU is not repackaged before it is transmitted over the contactless link. Instead, the data is directly sent over the contactless link, bit by bit. For example, if a host processor is providing data that is packaged according to a USB protocol to a CCTU, the CCTU does not need to repackage the USB packaged data in order to transmit it over the contactless link to a CCRU. Since the USB packaged data is not repackaged by the CCTU, the CCRU need not unpack the received USB packaged data. As a result, the CCRU can pass the received data, as is, to a component contained in the recipient device. This advantageously speeds up data transfer by eliminating the need to package and unpack data in order for it to be transferred over a contactless link.

The establishment of a USB EHF link can be performed without requiring the POC state machine. For example, there may be embodiments where a particular USB protocol is preset/fixed for both devices that are communicating with each other, and as a result, there is no need for capabilities state negotiation. For fixed USB protocol devices, the EHF link may be trained on power up, and after both devices enter into a data transport mode, data and/or USB state information may be transmitted over the EHF link.

FIG. 1 illustrates a communications system 100 wherein two electronic devices 102 and 122 may communicate with one another over a contactless communications link 150. Data may be transferred in at least one direction, from first device 102 which may be regarded as a "source" for sending the data to be transferred, to second device 122 which may be regarded as a "destination" for receiving the data which is transferred. With reference to FIG. 1, the transfer of data from first device 102 to second device 122 may be described. However, it should be understood that data may alternatively or additionally be transferred from second device 122 (acting as a "source" for sending the data) to first device 102 (acting as a "destination" for receiving the data), and that often information may be exchanged in both directions between devices 102 and 122 during a given communications session.

For illustrative clarity, devices 102 and 122 will be described as "mirror images" of one another, but it should be understood that the two devices 102 and 122 may be different than each other. For example, one of the devices may be a laptop computer, the other device may be a mobile phone. Some examples of electronic devices which may benefit from the techniques disclosed herein may include cell phones (or handsets, or smart phones), computers, docks (docking stations), laptops, tablets, or comparable electronic device, to name but a few.

First electronic device 102 may include a host system 104 and a contactless communication unit (which may be referred to as "smart" contactless connector, a communication subsystem, "smart connector", "contactless connector", or simply "connector") 106. The unit 106 associated with the electronic device may be generally capable of performing at least one of establishing and managing operation of contactless link 150 with unit 126, of second device 122, monitoring and modifying data passing through unit 106 onto link 150, and interfacing with and providing application support for host system 104. These functions of unit 106, with regard to interacting with link 150, the data and host system 104 may be described and elaborated upon and discussed in greater detail hereinbelow (or elsewhere in this disclosure).

Unit 106 associated with first device 102 may include some or all of the following elements: electrical interface 108, processor 110 and associated memory 112, control circuits 114, measurement circuits 116, and one or more transceivers 118. The operation of these various elements (110-118) may be described and elaborated upon and discussed in greater detail herein below (or elsewhere in this disclosure).

Second electronic device 122 may include host system 124 and a contactless communication unit (which may be referred to as "smart" contactless connector, or "communication unit", or "smart connector", or "contactless connector", or simply "connector") 126. The unit 126 associated with the electronic device may be generally capable of establishing and managing operation of contactless link 150 with unit 106, of first device 102, monitoring and modifying data passing though the unit 126 onto link 150, and interfacing with and providing application support for host system 124. These functions of unit 126, with regard to interacting with link 150, the data and the host system 124 may be described and elaborated upon and discussed in greater detail hereinbelow (or elsewhere in this disclosure).

Unit 126 associated with second device 122 may include some or all of the following elements: an electrical interface 128, processor 130 and associated memory 132, control circuits 134, measurement circuits 136, and one or more transceivers 138. The operation of these various elements (130-138) may be described and elaborated upon and discussed in greater detail hereinbelow (or elsewhere in this disclosure).

Units 106 and 126 may operate without intervention from the host processors (in the host systems 104 and 124, respectively), and may take control of the host system 104 and 124, respectively, or portions thereof. Units 106 and 126 may open/activate applications, return status/power levels, connection parameters, data types, information on devices/systems that are connected, content information, amount and type of data being transferred, including device configuration based on connection type, link management, quota information, channel control, and the like.

The dashed-line rectangles shown (in the figure) around the units 106 and 126 may simply represent "partitioning" of functions, separating (distinguishing) units 106 and 126 from host system 104 and 124, respectively. The antennae shown (symbolically) outside of the dashed-line rectangles may be considered to be within the functional blocks of units 106 and 126, but may be disposed either internal or external to a communications chip constituting the contactless connector. The dashed-line rectangles shown (in the figure) around units 106 and 126 may also represent non-conducting barriers (housings, enclosures, or the like, not shown), such as of plastic or acrylic enclosing units 106 and 126 or entire devices 102 and 122, respectively, as described hereinabove.

Electrical interfaces 108 and 128 may include communications port(s)/channel(s) to communicate with host systems 104 and 124, respectively. Host systems 104 and 124 may have their own processors and associated circuitry (not shown).

Processors 110 and 130 may be embedded microprocessors, or microcontrollers, or state machines, may run management OS for the connection, and may have built-in authentication/encryption engines. Processors 110 and 130, either alone or in combination with other elements presented herein, may be operative to manage the communications link 150, to monitor data passing through the units and over the communications link, or to provide application support for the host system, or to execute one or more state machines, or variations thereof as may become evident from the several functional descriptions set forth herein. In a broader sense, units 106 and 126 are capable of performing one of more of (at least one of) the various functions described herein.

Memory 112 and 132 may be RAM (random access memory), NVRAM (non-volatile RAM), or the like, and may include registers containing configuration, status, permissions, content permissions, keys for authentication/encryption, and the like.

Control circuits 114 and 134 may include any suitable circuitry capable of monitoring the state of the link and/or actively appending to or changing data concurrently ("on-the-fly") as it goes through unit 106 or 126, respectively.

Measurement circuits 116 and 136 may include any suitable circuitry capable of observing (monitoring) the connection state/status, the connection type and the data being transmitted. Sensors (not shown) may be included to monitor signal strength, ambient environmental conditions, and the like. Signal-to-noise ratio can be used as an indicator of signal quality.

Transceivers 118 and 138 may include any transceivers (and associated transducers or antennas) suitable for converting between electrical signals (for the host system) and electromagnetic signals (for the contactless communications link), such as have been described hereinabove. Transceivers 118 and 138 may each be a half-duplex transceiver which can asynchronously convert a baseband signal into a modulated EHF carrier which is radiated from an internal or external antenna (shown schematically only), or can receive and demodulate the carrier and reproduce the original baseband signal. The EHF carrier may penetrate a wide variety of commonly-used non-conductive materials (glass, plastic, etc.).

It should be understood that if only one-way communication is required, such as from first device 102 to second device 122, transceiver 118 could be replaced by a Tx and transceiver 138 could be replaced by a Rx.

Transmit power and receive sensitivity for transceivers 118 and 138 may be controlled to minimize electromagnetic interference effects and simplify FCC certification, if required.

Transceivers 118 and 138 may be implemented as IC chips comprising a Tx, a Rx and related components. Transceiver chip(s) may be packaged in a conventional manner, such as in BGA (ball grid array) format. The antenna may be integrated into the package, or may be external to the package, or may be incorporated onto the chip itself. An exemplary unit 106, 126 may include one, two, or more transceiver chips. Some features or characteristics of the transceivers 118 and 138 may include low latency signal path, multi-gigabit data rates, link detection and link training. The signals transmitted by transceivers 118 and 138 may be modulated in any suitable manner to convey the data being transferred from one device to the other device, some non-limiting examples of which are presented herein. Modulation may be OOK (on/off keying), ASK, PSK, QPSK, QAM or other similar simple modulation techniques. Signals may be encoded and packetized and transmitted by one transceiver (such as 118), and received and unpacketized and decoded by another transceiver (such as 138). Out-of-band (OOB) signaling or other suitable techniques may be used to convey information other than or related to the data being transferred between the two devices.

Transceivers 118 and 138, or individual transmitters and receivers, which may be implemented as chips, may be factory-serialized, so that the chips and their transmissions may be 'tagged' (fingerprinted), which may enable a later forensic analysis to be performed for digital rights management (DRM). For example, protected (premium) content could be freely transferred from one device to another, but the transaction could be traced to the specific devices involved, so that the participants in the transaction can be held accountable (such as, billed). Premium protected content may be modified, data appended thereto, and can be logged with chip ID, user ID, or by other means.

Communications link 150 may be a "contactless" link, and the first and second units 106 and 126 may be "contactless" connectors, as described herein. Differences between units 106 and 126 disclosed herein and conventional mechanical connectors may be immediately apparent, and may be described herein. The units may be considered to be communication subsystems of a host device. In this regard, differences between the contactless connectors 106 and 126 disclosed herein and controllers such as Ethernet (Standard) controllers may not be immediately apparent in that both may handle data flow between a host system and a communications link. However, a distinction between the contactless connectors disclosed herein and exemplary Standards controllers is that the contactless connectors disclosed herein both set up the contactless communications link and transfer data from a host system directly onto the contactless communications link, without the intermediary (for example) of mechanical (electrical, not RF) connectors and a cable. Further distinctions may be made in the way that the contactless connectors disclosed herein are capable of operating independently and transparently from the host system, without requiring host awareness or interaction.

Data transfer between electronic devices 102 and 122 may be implemented over a "contactless" RF electromagnetic communications link (interface) 150, which is handled substantially entirely by the units 106 and 126 of first and second devices 102 and 122, respectively. Signals flow between the devices 102 and 122 electromagnetically over a non-electrical (dielectric) medium such as an air gap, waveguide, plastics (polyethylene, thermoplastic polymers, polyvinylidene difluoride, fluoropolymers, ABS, and other plastics), including combinations of these materials. The EHF signal can pass through other dielectric materials such as cardboard. The EHF signal can pass through a series of different dielectric materials and/or waveguides.

Due to the high data rate enabled by the EHF contactless communication, large data files, such as movies, audio, device images, operating systems, and the like may be transferred in very short periods of time in contrast with existing technologies such as NFC. As an example, a 1 Gigabyte data file may be transferred in as little as 2 seconds. The electromagnetic communication may typically be over an air gap may be limited to a short range, such as 0-5 cm. A dielectric medium such as a dielectric coupler, may be used to extend the range of the contactless link between the devices 102 and 122 to several centimeters (cm), meters, or more.

The communications link may include a dielectric medium that may include one or more of an air gap, a waveguide, and plastics. Alternatively, the communications link may be a slot antenna in a conductive medium, the slot antenna directing the contactless connectivity in a desired direction. A device (at least the contactless connector) may be substantially fully enclosed by a conductive medium other than at a location where it is desired to emit and receive EHF radiation from a partner device (at least the contactless connector thereof) which may also be similarly substantially fully enclosed by a conductive medium.

It should be understood that in this, and any other embodiments of contactless links discussed herein, an overall communications system may be implemented as a combination of contactless and physical links. Furthermore, some of the techniques described herein may be applied to transferring data over a physical link. In such a link the transceiver can contactlessly transmit data to a cable that serves as a physical conduit for the data.

One or both of devices 102 and 122 may have two (or more) transceivers. Having two (or more) transceivers may support a feedback loop, latency, changes, full duplex operation, and simultaneously establishing a second communications link (such as for communicating with the host system). An exemplary "data flow" may proceed as follows. Data originating from host system 104 (or data originating at unit 106) may be provided by unit 106, via its transceiver 118, onto the communications link 150. The data passes through (or over) communications link 150. Data received from the communications link 150 by the transceiver 138 of unit 126 may be provided to host system 124 (or may remain in unit 126). Data may flow in the reverse direction, from host system 124 via unit 126 (or originating at unit 126) onto the contactless link 150 to unit 106 which may pass the data to the host system 104.

Figure 2:
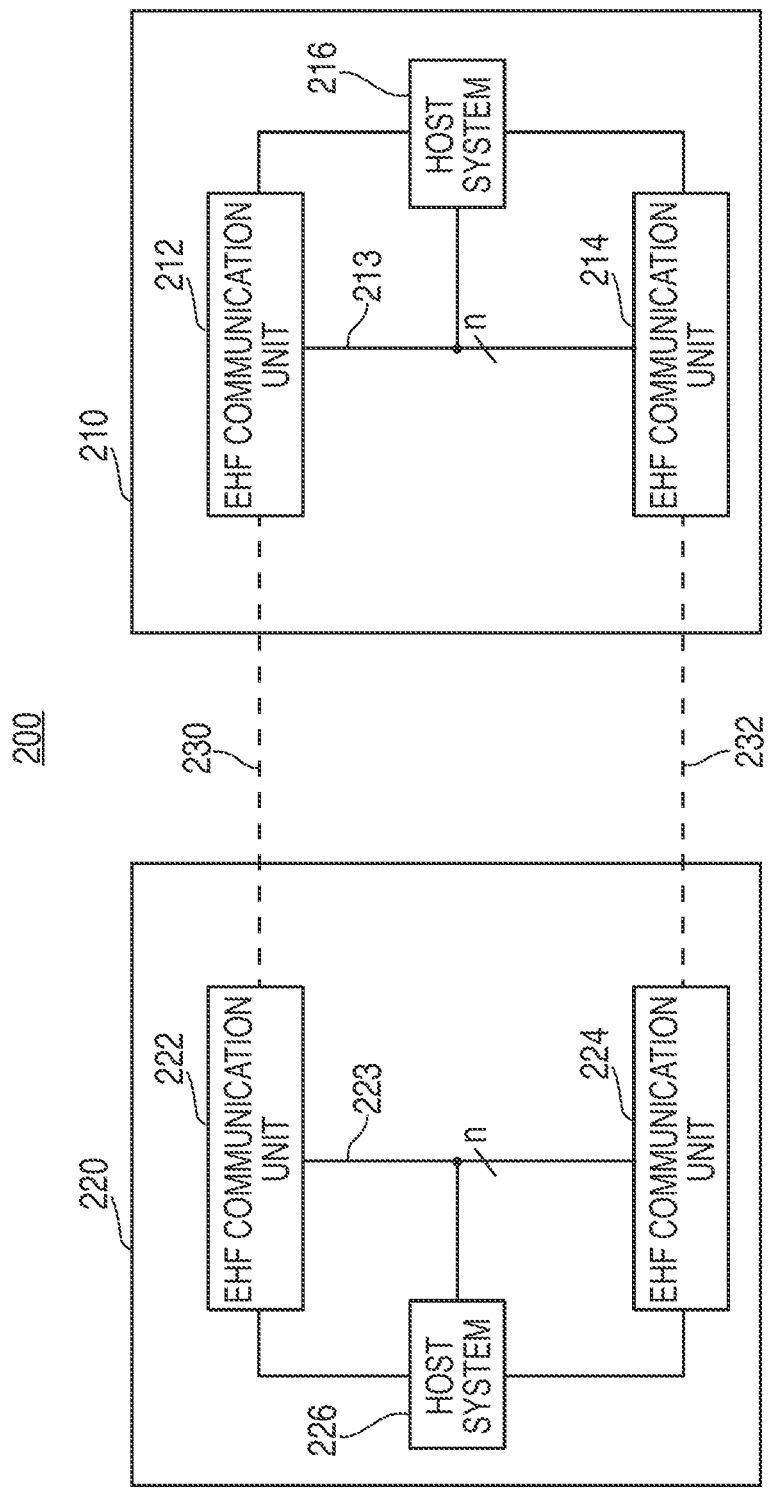
FIG. 2 illustrates a communications system in which two electronic devices communicate with one another over two or more contactless communications links, according to an embodiment.

FIG. 2 illustrates a communications system 200 wherein two electronic devices 210 and 220 may communicate with one another over two or more contactless communications links, according to an embodiment. System 200 may be similar to system 100 in many respects, but for illustrative and simplified discussion purposes, shows that each device includes two EHF communication units. Moreover, any EHF communication unit in system 200 may be the same or substantially the same as any EHF communication unit in system 100. As such, a more simplified representation of units 106 and 126 are shown in FIG. 2. If desired, each device can include three, four, five, or more EHF communication units. First device 210 may include EHF communication unit 212, EHF communication unit 214, and host system 216. One or more wired paths 213 may directly connect EHF communication units 212 and 214 together. Host system 216 may communicate with EHF communication units 212 and 214. In some embodiments, EHF communication units 212 and 214 may communicate with each other through host system 216. In other embodiments, host system 216 may be able to drive a signal on at least one of wired paths 213. Similarly, second device 220 may include EHF communication unit 222, EHF communication unit 224, and host system 226. One or more wired paths 223 may directly connect EHF communication units 222 and 224 together. Host system 226 may communicate with EHF communication units 222 and 224. In some embodiments, EHF communication units 222 and 224 may communicate with each other through host system 226. In other embodiments, host system 226 may be able to drive a signal on at least one of wired paths 223. Host systems 216 and 226 may be similar to host systems 104 and 124, both of which include circuitry specific to their respective devices and thereby enable devices 210 and 220 to operate for their intended functionality.

In some embodiments, each of EHF communication units 212, 214, 222, and 224 can be the same as EHF communication unit 106 or 126, discussed above. As such, EHF communication units 212, 214, 222, and 224 include transceivers capable of being configured to transmit and/or receive EHF signals. For example, in one approach, units 212 and 224 can be configured to receive EHF signals and units 214 and 222 can be configured to transmit EHF signals. Thus, in this approach, a contactless communications link 230 may exist between EHF communication units 212 and 222, and contactless communications link 232 may exist between EHF communication units 214 and 224. As shown, units 212 and 222 may work together as a coupled pair of units that communicate via link 230, and units 214 and 224 may work together as another coupled pair of units that communicate via link 232. If one or more additional coupled pairs of units were to be included in system 200, then additional communications links would also exist.

Embodiments discussed herein refer to systems, methods, and circuits for establishing the contactless communications links among coupled pairs of EHF communication units. In order for devices 210 and 220 to communicate with each other using one or more contactless links, the EHF units responsible for establishing those links may have to progress through a series of steps before data can be transferred between the devices. These steps may be controlled by one or more state machines that are being implemented in each contactless communication unit. Collectively, regardless of whether one or more state machines are used to establish a link, the state machine(s) may be referred to herein as a POC state machine. Each contactless communication unit may implement its own POC state machine in order to establish a link with a counterpart unit.

Each POC state machine may collaborate to progressively transition their respective communication units through a plurality of states before enabling one or more contactless communications links. The collaboration may be necessary because the mechanism and process of establishing the contactless communications links, and enabling data transfer from a host system directly onto the contactless communications link, is performed without the intermediary (for example) of mechanical (electrical, not RF) connectors and a cable. As such, because there is no electrical connection (except perhaps for delivering power) between, for example, units 212 and 222, the POC state machines may rely on a "wake up" loop (sometimes referred to herein as a closed link loop) to communicate with each other before the contactless communications link is established. In some embodiments, the POC state machine may collaborate with the state machine of the host system. For example, an entry into power up or power down state may be directed by the host system.

The wake up loop can be an inter-unit communications channel that includes a combination of wired and contactless paths. The wake up loop can also include as many contactless units as necessary to provide the communications channel needed to establish one or more communications links. In some embodiments, only two units can be used. A wake up loop using only two units may require selective gating of each unit's transceiver so that a loop can exist over a single contactless path. In other embodiments, such as that shown in FIG. 2, at least four units can be used to define a wake up loop. As shown, the wake up loop in system 200 can include unit 212, wired path 213, unit 214, contactless path 232, unit 224, wired path 223, unit 222, and contactless path 230. Thus, in this arrangement, although units 212 and 222 may be operative to establish link 230, they may depend on the wake up loop to communicate with each other to establish link 230. For example, assume that unit 222 operates as a Tx unit and unit 212 operates as an Rx unit. Since unit 222 is a Tx unit, it may be able to transmit signals directly to unit 212 via link 230. However, because unit 212 is operating as a receiver unit, it is not able to transmit signals to unit 222 via the same link 230. Instead, unit 212 may communicate with unit 222 indirectly using a combination of wired and contactless paths in the wake up loop. In this example, unit 212 may communicate with unit 222 via wired path 213, unit 214, link 232, unit 224, and wired path 223. Thus, in order for a coupled pair to communicate signals back and forth among each other, the coupled pair may leverage the wake up loop (e.g., the wired paths connected to another coupled pair, and the contactless path existing between that other coupled pair).

The wake up loop may define upstream and downstream relationships among the contactless communication units. The direction of the wake up loop may be based on the Tx/Rx designations for each of the communication units. For example, in system 200, assuming units 214 and 222 are transmitters, and units 212 and 224 are receivers, the wake up loop may progress in a clockwise direction. In a clockwise oriented wake up loop, unit 214 may be immediately downstream from unit 212, and unit 222 may be immediately upstream from unit 212. As another example, assuming units 214 and 222 are receivers, and units 212 and 224 are transmitters, the wake up loop may progress in a counter-clockwise direction.

The collaborative nature of the POC state machine may be realized in that a state change transition of a first POC state machine may propagate around the wake up loop to cause a new state change in each downstream POC state machine. Each state change transition may prompt any given communications unit to notify its immediately downstream unit of its state change, thereby prompting the POC state machine of that downstream unit to transition to a new state. Thus, in order for the first POC state machine to transition to a new state, it may have to wait for state changes to propagate all the way around the loop, back to the first POC state machine. Thus, the first POC state machine may have to wait for the state machine of the immediate upstream unit to transition to a new state, and receive notification of that transition, before the first POC state machine can transition to a new state. This propagation of new state change transitions may continue to loop around the wake up loop until one or more links are enabled to transmit data between devices. In order to begin the wake up loop, a host system may assert one or more signals to one or more EHF communications units. The POC state machines of the targeted EHF communication units may transition to a new state or may begin beaconing or listening as described below in response to the signals from the host system.

As discussed above, each communication unit executes its own POC state machine. That POC state machine may include several different states (discussed below). In order for the POC state machine to cause state change transitions from one state to another, one or more conditions may have to be met. Some of these conditions may be provided as notifications from sources external to the communication unit or can be generated internally within the communications unit. Externally sourced notifications can be received via the transceiver or pins that make up part of an integrated circuit package of the unit. In order to provide a basis for discussing where such notifications can be received and generated, reference is now made to FIG. 3.

Figure 3:
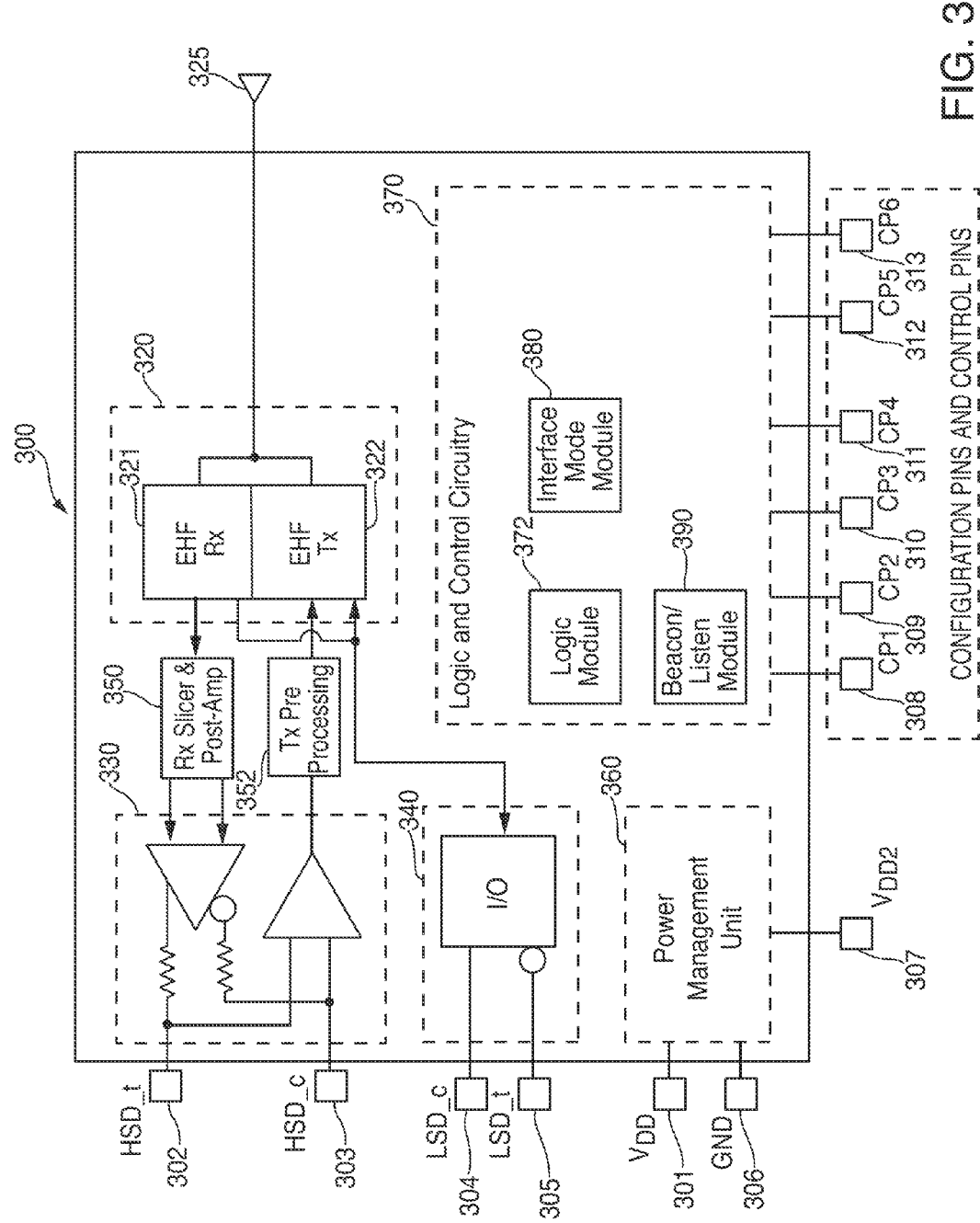
FIG. 3 is an illustrative schematic diagram of an EHF communication unit, according to an embodiment.

FIG. 3 shows an illustrative block diagram of EHF contactless communication unit 300 according to an embodiment. Unit 300 may be, for example, an IC including several pins. As shown, unit 300 may include pins 301-313, EHF transceiver 320, antenna 325, high-speed circuitry 330, low-speed circuitry 340, receiver slicer and post-amp circuitry 350, transmitter pre-processing circuitry 352, power management circuitry 360, and logic and control circuitry 370. Logic and control circuitry 370 may include several modules, which may represent hardware and/or software components for operating specific functions of unit 300. For example, logic and control circuitry may include logic module 372, interface mode module 380, and beacon/listen module 390. $V_{DD}$ pin 301 may be coupled to an external source for powering unit 300. $V_{DD2}$ pin 307 may be an optional pin as shown, or it may be internally bonded to $V_{DD}$ pin 301. Ground pin 306 may be coupled to a ground source (not shown). High-speed circuitry 330, low-speed circuitry 340, receiver slicer and post-amp circuitry 350, and transceiver pre-processing 352 may be referred to collectively herein as baseband circuitry. Power management circuitry 360, logic and control circuitry 370, logic module 372, interface module 380, and beacon/listen module 390 may be referred to herein as control circuitry.

High-speed differential ("HSD") pins 302 and 303 may function as input and/or output pins for high-speed circuitry

330. High-speed circuitry 330 may be operative to process signals according to various protocols, including, for example, USB, SATA, PCIe, and DP. Low-speed differential ("LSD") pins 304 and 305 may function as input and/or output pins for low-speed circuitry 340. Low-speed circuitry 340 may be operative to process signals according to various protocols, including for example USB high-speed/fill-speed, DP Auxiliary, I2S, GPIO, I2C, and other low speed signaling schemes. In some embodiments, low-speed circuitry 340 may process protocols that operate at speeds that are slower relative to protocols processed by high-speed circuitry 340. In some embodiments, high and low speed circuitry 330 and 340 may provide baseband functionality.

Transceiver 320 may be coupled to antenna 325, high-speed circuitry 330, and low-speed circuitry 340. Transceiver 320 may include an EHF Rx 321 and an EHF Tx 322. Unit 300 may be designated to operate as either a Tx unit (in which case EHF Tx 322 is selected for operation) or a Rx unit (in which case EHF Rx 321 is selected for operation). EHF receiver unit 321 may be coupled to high-speed circuitry 330 via receiver slicer and post-amp circuitry 350. Receiver slicer and post-amp circuitry 350 may assist high-speed circuitry 330 in processing high-speed protocols. The output of EHF receiver 321 or receiver slicer and post-amp circuitry 350 may be coupled to circuitry 340. Circuitry 340 may operate as a bidirectional data transfer block either in half-duplex mode or full-duplex mode acting as buffer between the data being transferred between electrical interface 304/305 and EHF transceiver 320. EHF Tx 322 may be coupled to high-speed circuitry 330 and low-speed circuitry 340.

Logic and control circuitry 370 may be operative to control operation of unit 300 according to various embodiments. In some embodiments, logic module 372 may operate a POC state machine that manages the establishment of a contactless link with another unit. Logic and control circuitry 370 may communicate with transceiver 320, high-speed circuitry 330, low-speed circuitry 340, and receiver slicer and post amp circuitry 350. Logic and control circuitry 370 can use interface module 380 to operate unit 300 in a serial interface control mode, such as when using the serial peripheral interface protocol ("SPI"). The serial interface control mode may be used to perform various diagnostic tests, such as a laboratory and automatic test equipment ("ATE") test, and to perform advanced control and manufacturing trim. When unit 300 is not operating in the serial interface control mode, it may operate in a pin-strapped control mode. In this mode, the operating state of unit 300 is controlled by static settings of one or more of pins 301-313, and particularly with respect to settings of pins 308-313. Logic and control circuitry 370 may be coupled to pins 308-313, and may be configured to operate unit 300 based on signals provided on one or more of pins 308-313. Pins 308-313 may be referred to herein collectively as configuration and control pins, and have pin designations CP1-CP6. Some of the pins may act as status or indicator pins, and some may serve as input pins, output pins, or both input and output pins.

The configuration and control pins may indicate which data transport mode should be used for transporting data across a contactless communication link established using unit 300. In particular, CP2 pin 309 may be a first data transport selection pin, and CP3 pin 310 may be a second data transport selection pin. Pins 309 and 310 may be set to a logic HIGH, logic LOW, or left to FLOAT. CP1 pin 308 may function as another data transport selection pin or as an identification pin. CP1 pin 308 may be driven to one of HIGH, LOW, and FLOAT with a high/low/Z driver. When CP1 pin 308 is left to FLOAT, the impedance on the pin may be used to identify which data transport should be used.

CP4 pin 311 may be set to specify whether unit 300 is to function in a Tx mode, a Rx mode, or a control mode, which would utilize interface circuitry 380. CP5 pin 312 may be used for inter unit communications. For example, unit 300 may be able to communicate with another unit (not shown) via CP5 pin 312. Referring briefly to FIG. 2, wired path 213 may be coupled to respective CP5 pins on both units 212 and 214. This inter unit communication may be used to establish wired portions of a wake up loop among a set of contactless units. CP6 pin 313 can be used as part of a beacon/listen state machine, which may be controlled by beacon/listen module 390, and which also may be a subset of the POC state machine. For example, when CP6 pin 313 is driven HIGH, communication unit 300 may be turned ON and begins operating according to the beacon/listen state machine.

Beacon/Listen module 390 may include circuitry for operating a beaconing/listening state machine. Depending on whether unit 300 is configured to operate as a Tx or a Rx dictates whether the beacon/listen state machine operates as a beacon state machine or a listen state machine. The beacon state machine may be implemented when unit 300 is configured for operation as a Tx and the listen state machine may be implemented when unit 300 is configured for operation as an Rx. Beacon/Listen module 390 may use relatively low power consuming circuitry when power is applied to $V_{DD}$ pin 301. Its power consumption may be relatively low compared to the power requirements of logic module 372. As will be explained in more detail below, unit 300 may initially cycle through the beaconing/listening state machine portion of the POC state machine to conserve power, and then operate according to a relatively higher power consuming portion of the POC state machine.

Power management circuitry 360 may be operative to regulate power received via pin 301 and provide regulated power at one or more different power levels, including appropriate voltage levels, to components within unit 300. For example, power management circuitry 360 may provide power to beacon/listen circuitry 390 when unit 300 is operating according to the beaconing/listening state machine.

Figure 4:
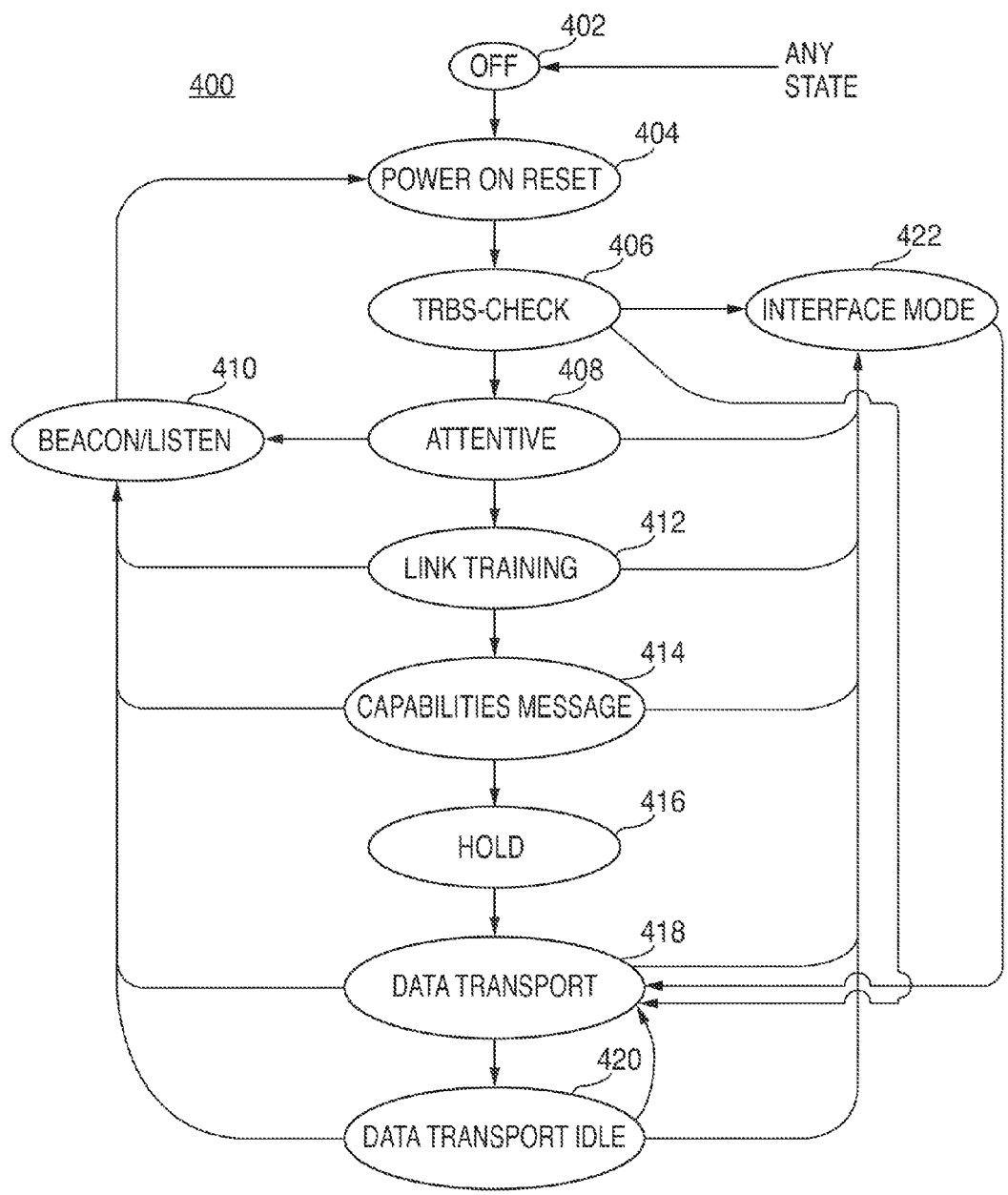
FIG. 4 shows an illustrative flowchart showing different states of a state machine, according to an embodiment.
Figure 5:
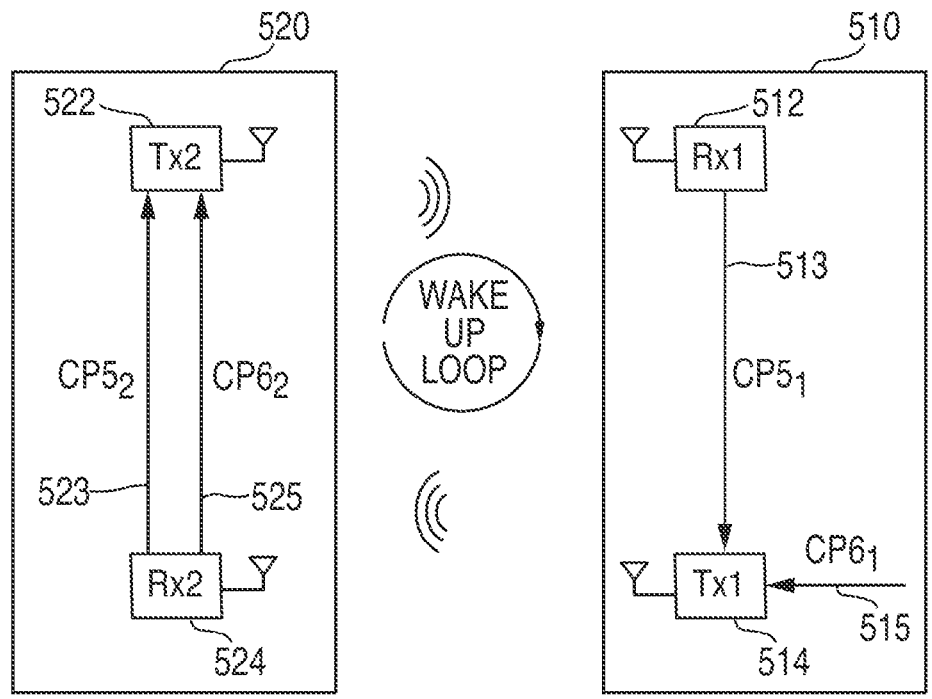
FIG. 5 is an illustrative system including several EHF communication units arranged in a wake up loop, according to an embodiment.

FIG. 4 shows an illustrative flowchart of various states of the POC state machine according to an embodiment. It is understood that the POC state machine can be implemented in any communication unit, regardless of which transport mode it supports or which wake up loop configuration is used. The wake up loop configuration of FIG. 5 is being referenced in connection with the POC state machine discussion, but it is understood that the POC state machine may be used in the wake up loop configurations of FIGS. 6 and 7.

Each POC state machine may collaborate to progressively transition its respective communication units through a plurality of states before establishing one or more contactless communications links. The collaboration may be necessary because the mechanism and process of establishing the contactless communications links, and enabling data transfer from a host system directly onto the contactless communications link, is performed without the intermediary (for example) of mechanical (electrical, not RF) connectors and a cable. As such, because there is no electrical connection (except perhaps for delivering power) between EHF communication units, the POC state machines may rely on a "wake up" loop (sometimes referred to herein as a closed link loop) to communicate with each other before the contactless communications link is established.

The wake up loop can be an inter-unit communications channel that includes a combination of wired and contactless paths. The wake up loop can also include as many contactless units as necessary to provide the communications channel needed to establish one or more communications links. The wake up loop may define upstream and downstream relationships among the contactless communication units. The direction of the wake up loop may be based on the Tx/Rx designations for each of the communication units. The collaborative nature of the POC state machine may be realized in that a state change transition of a first POC state machine may propagate around the wake up loop to cause a new state change in each downstream POC state machine. Each state change transition may prompt any given communications unit to notify its immediately downstream unit of its state change, thereby prompting the POC state machine of that downstream unit to transition to a new state. Thus, in order for the first POC state machine to transition to a new state, it may have to wait for state changes to propagate all the way around the loop, back to the first POC state machine. Thus, the first POC state machine may have to wait for the state machine of the immediate upstream unit to transition to a new state, and receive notification of that transition, before the first POC state machine can transition to a new state. This propagation of new state change transitions may continue to loop around the wake up loop until one or more links are enabled to transmit data between devices.

Each communication unit executes its own POC state machine, which may include several different states. In order for the POC state machine to cause a state change transition from one state to another, one or more conditions may have to be met. Some of these conditions may be provided as notifications from sources external to the communication unit or can be generated internally within the communications unit. Externally sourced notifications or signals can be received via the transceiver or pins that make up part of an integrated circuit package of the unit.

The operation of one or more states of the POC state machine may vary depending on whether the POC state machine is being implemented in an EHF unit configured to operate as a Rx or a Tx. For example, one state may be a beacon/listen state, which may enable a unit to operate in a relatively low power mode prior to advancing through additional states to establish the communication link. A Tx unit may be configured to transmit an EHF beaconing signal when in the beacon/listen state, whereas a Rx unit may be configured to listen for the EHF beaconing signal. As a specific example, an apparatus can include an EHF transceiver and control circuitry coupled to the EHF transceiver. The control circuitry may be operative to control establishment of an EHF communications link with another apparatus by executing a state machine that transitions from state to state in response to satisfaction of any one of a plurality of conditions, and selectively execute one of a beaconing cycle and a listening cycle based on a configuration of the apparatus, wherein the beaconing cycle is executed if the configuration is a Tx configuration, and wherein the listening cycle is executed if the configuration is a Rx configuration. The control circuitry may execute the selected one of the beaconing cycle and the listening cycle until the state machine transitions to a new state.

A link training state may be another state that varies depending on whether it is being implemented in a Tx or Rx unit. Link training may enable a Rx unit to calibrate itself based on a "link training" signal transmitted by a Tx unit. The Tx unit may transmit the link training signals when in the link training state. The Rx unit may receive and process the link training signals and calibrate itself for receiving future EHF signals from the Tx unit when in the link training state. As a specific example, an apparatus can include an EHF transceiver and control circuitry. The control circuitry can control establishment of an EHF communications link with another apparatus by executing a state machine that transitions from state to state in response to satisfaction of any one of a plurality of conditions. The control circuitry can, selectively execute one of a transmission of a link training pattern and a calibration of at least one parameter, wherein the transmission of the link training pattern is executed if the configuration is a Tx configuration, and wherein the calibration of at least one parameter is executed if the configuration is an Rx configuration. The control circuitry can execute the selected one of the transmission and the calibration until the state machine transitions to a new state.

A capabilities messaging state may be another state that varies depending on whether it is being implemented in a Tx or Rx unit. The capabilities message may be transmitted by a Tx unit and received by a Rx unit. The capabilities message may include information, for example, that enables the Tx and Rx units to validate whether they can establish a link and a protocol according to which data can be communicated. As a specific example, an apparatus can include an EHF transceiver and control circuitry. The control circuitry may control establishment of an EHF communications link with another apparatus by executing a state machine that transitions from state to state in response to satisfaction of any one of a plurality of conditions. The control circuitry can selectively execute one of a transmission of a capabilities message and a validation of a received capabilities message, wherein the transmission of the capabilities message is executed if the configuration is a Tx configuration, and wherein the validation of the received capabilities message is executed if the configuration is an Rx configuration. The control circuitry and execute the selected one of the transmission and the validation until the state machine transitions to a new state.

A power savings mode state or data transport idle state may be another state that varies depending on whether it is being implemented in a Tx or Rx unit. The power savings state may enable an EHF communication unit to power down selective circuitry, after the EHF communication link has been established, when there is no data to be communicated over the link. The Tx unit may transmit a "keep alive" signal to the Rx unit to prevent it from timing out and exiting out of its power savings mode. The Rx unit may be periodically turned on to monitor whether the Tx is sending the "keep alive" signal. The Tx and Rx units may transition to a new state (e.g., a data transport state) when they receive instructions to do so. As a specific example, an apparatus can include an EHF transceiver and a control circuitry. The control circuitry may be operative to control establishment of an EHF communications link with another apparatus by executing a state machine that transitions from state to state in response to satisfaction of any one of a plurality of conditions, establish the EHF communication link with the apparatus to selectively enable one of transmission and reception of data, after the EHF communication link with the apparatus is established, monitor an absence of data, a low signal, or a specific signal being communicated over the EHF communication link, and enter into a power savings state in response to the monitored absence of data, a low signal, or a specific signal being communicated over the EHF communication link until the state machine transitions to a new state.

In some embodiments, the PI state machines (discussed in more detail in connection with FIGS. 18-24) may be implemented as part of the POC state machine or independently of the POC state machine. There are several embodiments of these interface state machines including but not limited to interface protocols such as USB 2.0, USB 3.0, USB 3/2 Auto switchable protocols and USB OTG protocol. For example, the PI state machine may be executed during the capabilities state. In another example, the PI state machine may be executed in conjunction with several POC states. For example, the PI state machine may be implemented during the capabilities and data transport states.

The POC state machine is operative to handle both the pin-strapped and serial interface control modes of any EHF communication unit. As discussed above, the mode of operation can be set by the states of various control (or configuration) pins, such as, for example, CP1 pin 308, CP2 pin 309, CP3 pin 310, and CP4 pin 311. When an EHF communication unit is configured for a pin strap mode of operation, one or more of the control pins may specify which transport mode the unit should operate in. The POC state machine may manage the unit's POC as it "wakes up" to establish a communications link. As will be explained below, the POC state machine "wakes up" the unit by transitioning from state to state until it reaches a data transport state. The transition from one state to another may depend on the satisfaction of one or more conditions, and the notification of a state change or satisfaction of a condition may be transmitted in a loop like manner around the wake-up loop. Some of the conditions for executing state change transitions may vary depending on which transport mode is selected.

Condition satisfaction notifications are made during the wake-up loop and communicated among the EHF communication units. As the closed looped link is established, each unit in the link progressively "wakes up" and transitions to new states in a loop-like manner. This loop-like sequence of state changes is referred to herein as a POC. Thus, in a POC link awaking, a state change of an EHF communication unit may depend on a state change of an upstream EHF communication unit. In particular, the upstream EHF communication unit may be the immediately preceding EHF communication unit in the closed loop. Some of the conditions for executing state change transitions may vary depending on which transport mode is selected. For example, when a first EHF communication unit transitions from one state to another, it may transmit a signal to a downstream EHF communication unit. This transmitted signal may affect a future state of the first EHF communication unit. That is, the transmitted signal may induce a state change in one or more downstream EHF units in the wake-up loop, which results in a future state change from the first EHF communication unit.

FIG. 5 shows an illustrative full duplex link of units showing contactless EHF couplings and CP5 connections according to an embodiment. As shown, first device 510 includes Rx unit 512 and Tx unit 514, and second device 520 includes Tx unit 522 and Rx unit 524. Units 512, 514, 522, and 524 may have the same pin configurations and functional blocks as unit 300 of FIG. 3. Rx unit 512 may be operative to receive contactless EHF signals from Tx unit 522, and Tx unit 514 may be operative to transmit contactless EHF signals to Rx unit 524. Thus, Rx unit 512 and Tx unit 522 may form a first contactlessly coupled pair, and Rx unit 524 and Tx unit 514 may form a second contactlessly coupled pair. In addition, Rx unit 512 may communicate with Tx unit 514 via wired path 513, and Rx unit 524 may communicate with Tx unit 522 via wired path 523. Wired path 513 (also labeled as $CP5_1$) may be coupled to respective CP5 pins of both units 512 and 514, and wired path 523 (also labeled as $CP5_2$) may be coupled to respective CP5 pins of both units 522 and 524. Thus, communication between first device 510 and second device 520 can be achieved via the first and second contactlessly coupled pairs and communication among units within any device can be achieved via wired pathways (e.g., pathways connected to CP5 pins). FIG. 5 also shows that the CP6 pin 515 (labeled as $CP6_1$) for Tx 514 is being driven by circuitry other than Rx unit 512 (e.g., a host system), and that the CP6 pin 525 (labeled as $CP6_2$) for Tx unit 522 is being driven by Rx unit 524.

A wake up loop of FIG. 5 may begin with Tx unit 514, and proceed to Rx unit 524 via contactless EHF signals being emitted by Tx unit 514. The loop continues from Rx unit 524 to Tx unit 522 via wired path 523 and/or wired path 525. From Tx unit 522, the loop continues to Rx unit 512 via contactless EHF signals being emitted by Tx unit 522. The loop is completed via wired path 513, which couples Rx unit 512 to Tx unit 514. Thus, in one embodiment, the closed loop link of FIG. 5 is a clockwise loop starting with Tx unit 514 and ending with Rx unit 512. Thus, in this embodiment, Rx unit 524 is immediately downstream of Tx unit 514, and Tx unit 514 is immediately upstream of Rx unit 524. In another embodiment, the closed loop link can start with Tx unit 522 and end with Rx unit 524 in a clockwise loop that includes Rx unit 512 and Tx unit 514. In this embodiment, Tx unit 522 may be the first EHF unit to be activated in the link, in which case the $CP6_2$ pin may be activated by the host system of device 520. In yet another embodiment, the closed loop link can move in a counter-clockwise direction. In such an embodiment, devices 510 and 520 would be transposed (e.g., in FIG. 5, device 510 would be placed left of device 520 and the antennas would be drawn so that the antennas for Tx1 and Rx2 face each other and the antennas for Tx2 and Rx2 face each other).

POC state machine 400 can include the following states: OFF state 402, power ON reset state 404, check state 406, attentive state 408, beacon/listen state 410, link training state 412, capabilities messaging state 414, hold state 416, data transport state 418, and data transport idle state 420. Actions taken by POC state machine 400 in response to transitioning to each state may vary depending on whether the unit executing the POC state machine is functioning as a Tx unit or a Rx unit. POC state machine 400 transitions from one state to another when various conditions are satisfied.

State machine 400 may begin in OFF state 402 and may exist in this state when no power is applied to the unit's $V_{DD}$ pin. An EHF communication unit can transition from OFF state 402 to power ON reset state 404 when power (e.g., $V_{DD}$) is applied to the unit's $V_{DD}$ pin. For example, Tx unit 514 may transition to power ON reset state 404 when an external power source is applied to $V_{DD}$ pin 301. As its name implies, power ON reset state 404 includes powering ON of the unit and a reset of the unit. As the unit receives power via its $V_{DD}$ pin, its internal $V_{DD}$ pin may also receive power. When a power level on the internal $V_{DD}$ pin reaches or exceeds a threshold (e.g., 80% of full supply level), the unit may be reset. The POC state machine transitions to TRBS-Check state 406 when the internal $V_{DD}$ exceeds the threshold. During reset, one or more or all of the unit's outputs may be tri-stated (not driven or floating). Example output pins may include high-speed input/output pins 302/303, low-speed input/output pins 304/305, CP5 312, CP6 313, and CP1 308.

In TRBS-Check state 406, the unit checks whether its CP4 pin (e.g., CP4 pin 311) is HIGH, LOW, or FLOATING. As discussed above, the status of the CP4 pin can dictate whether the unit will operate as a Tx or a Rx, or whether the unit is to undergo testing in a serial interface control mode. If the CP4 pin is HIGH or LOW, the POC state machine transitions to attention state 408. If the device is configured to go directly to Data Transport state 418 (bypassing states 408, 412, 414, and 416), the POC state machine may go directly to Data Transport state 418 from TRBS-Check state after the determination of the state of the CP4 pin. After the CP4 pin determination is made, the POC state machine may delay transition to state 408 by a first period of time if the CP4 pin specifies the unit should operate as a Tx, and by a second period of time if the CP4 pin specifies the unit should operate as a Rx. The second time period may be greater than the first time period. These transition delays may assist in link discovery. If the CP4 pin is FLOATING, the POC state machine may transition to interface mode 422.

In attentive state 408, the unit may activate circuitry other than that necessary to operate the beacon/listen state machine to evaluate whether to advance its state of consciousness to link training state 412 or function in the beacon/listen state 410.

In link training state 412, Tx unit 514 initiates training by transmitting a training pattern to Rx unit 524 to identify the optimum settings for one or both of the Tx and Rx units.

In capabilities message state 414, a Tx unit sends a capabilities message to its counterpart Rx unit. The Tx unit may send this message repeatedly until its CP5 pin is pulsed or until a timer times out. The message may specify information such as the transport mode, ID codes, etc. The Rx unit will monitor the received contactless signals for the capabilities message, and when the message is received, it may validate it against one or more validating parameters (e.g., transport mode, key information such as vendor IDs, and readiness state). If the message is validated, the Rx unit may pulse its CP5 pin. If no validated message is received within a time limit, then the Rx unit may revert back to state 410. The capability message may include information regarding the transport mode protocol.

The capabilities message may be communicated using any one of several different approaches. For example, in one approach, the capabilities message sent by the Tx unit may embody a series of pulse-width-coded (PWC) symbols. Additional details regarding use of PWC symbols to communicate the capabilities message is discussed below in connection with the description accompanying FIGS. 8-13. In another approach, the capabilities message may be communicated using packet transfers. The capability messaging may be performed in terms of packet transfers that are of a predetermined format. A single messaging packet may include a packet header and a packet body. The packet header may include one or more synchronization symbols, packet type information, vendor ID information, length of packet information while the body of the packet may include information regarding the transport mode protocol, error checking codes, data patterns that may aid the Rx in optimizing settings and other information that may be relevant to improving the capabilities of the EHF link. The messaging may be performed using multiple packets that may or may not be of the same type. In this case, the packet header may include information regarding the contents of a particular packet.

A Rx unit may transition from capabilities message state 414 to hold state 416 when the Rx determines that it has validated a message received from a Tx unit. Hold OFF state 416 is operative as a transition delay mechanism in delaying execution of transition to data transport state 418. Hold OFF state 416 may be included as part of POC state machine 400 to prevent the capabilities message from being erroneously processed by a Rx unit.

Data transport state 418 may represent the state in which the communication unit is ready to transmit and/or receive data according to a transport mode. As discussed above, the transport mode may be based on the states of CP1 pin 308, CP2 pin 309, CP3 pin 310, and CP4 pin 311. In some embodiments, when a Rx unit enters into state 418, it may drive its CP5 pin HIGH.

POC state machine 400 may transition to data transport idle state 420, for example, to conserve power. Data transport idle state 420 may enable the communications unit to enter into a quick entry/exit low power state for one or more transport modes. An Rx unit may enter into state 420 after it does not detect any EHF signaling activity (i.e., its counterpart Tx unit does not transmit any data), for example after a period of time, or it detects a low signal or a specific signal pattern. A Tx unit may enter into state 420 after it does not detect any activity on its baseband inputs (e.g., pins 302-305), for example after a period of time.

During data transport idle state 420, both the Rx and Tx unit may power cycle various components OFF to save power, but turn those components ON to check whether the unit needs to exit idle state 420 and return to state 418 or another state. For example, a Tx unit may power cycle its transceiver, but may supply power to its input buffer to detect input signals. The Tx may power cycle its transceiver to transmit a "keep alive pulse" to its counterpart Rx unit so that the Rx unit knows not to transition away from state 420. The "keep alive pulse" may be a series of "1's" every clock cycle for a fixed period of time. The Rx unit may power cycle its transceiver so that it can detect the "keep alive pulse."

POC state machine 400 may transition to data transport state 418 from data transport idle state 420 when the conditions of the transition are satisfied. A Tx unit may transition to state 418 when it receives a signal on its input buffer. An Rx unit may transition to state 418 when it receives a "non-idle" signal from its counterpart Tx. A "non-idle" may be a signal other than the "keep alive pulse". Upon receipt of an EHF signal from the Tx unit, the Rx unit may be inhibited from powering down until the EHF signal is classified as a keep-alive or wake-up signal.

POC state machine 400 may re-enter into a beacon/listen state machine at state 410 if any of the conditions associated with states 412, 414, 416, 418, and 420 are not met. POC state machine 400 may transition from state 406 directly to state 418 to bypass the POC and enter into a generic low speed data transport mode of operation. POC state machine 400 may operate in an interface mode state 422 for diagnostics, for example.

It is understood that the various states and arrangement of POC state machine 400 are merely illustrative and that additional states may be added and some states may be omitted. It is further understood that although POC state machine 400 is implemented by one particular EHF communication unit, that state machine 400 may depend on similar state machines being implemented in other EHF communication units to advance through its states to arrive at the data transport state. Thus, regardless of how many EHF communication units are being used to establish one or more EHF communication links, the interdependency of the state machines may result in a syncing of state machines. Thus, so long as all of the state machines remain in sync, each state machine may progress its consciousness. However, if one of the state machines falls out of sync, this may cause all of the state machines to fall of out sync, thereby resulting in a restart of the wake up link progression. For example, if one of the state machines fails to advance to a next state, and transitions back to beacon/listen state 410, all of the other state machines may also transition back to beacon/listen state 410. Transitioning back to state 410 can effectively reset each of the state machines, thereby restarting the process of establishing one or more EHF communication links and preventing false progressions in state change advances.

Figure 6:
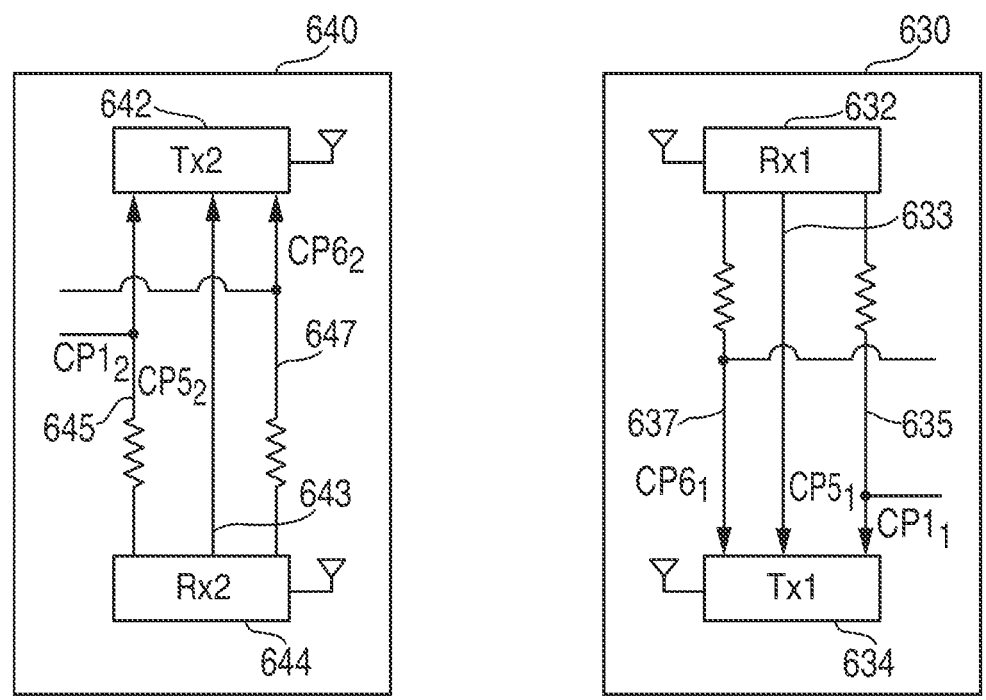
FIG. 6 is another illustrative system including several EHF communication units arranged in a wake up loop, according to an embodiment.

FIG. 5 shows another illustrative full duplex closed loop link of units showing contactless EHF couplings and CP5 connections according to an embodiment. The link arrangement of FIG. 6 is similar to that of FIG. 5, but is setup for a USB OTG configuration. As shown, first device 630 includes Rx unit 632 and Tx unit 634, and second device 640 includes Tx unit 642 and Rx unit 644. Rx unit 632 may be operative to receive contactless EHF signals from Tx unit 642, and Tx unit 634 may be operative to transmit contactless EHF signals to Rx unit 644. CP5 communications paths 633 and 643 may exist between respective EHF communication units as shown. In addition, the CP1 pins of units 632 and 634 may be connected together via wired pathway 635 that includes a resistor or other impedance element, and the CP1 pins of units 642 and 644 may be connected together via wired pathway 645 that includes a resistor or other impedance element. The CP6 pins of units 632 and 634 may be connected together via wired pathway 637 that includes a resistor or other impedance element, and the CP6 pins of units 642 and 644 may be connected together via pathway 647 that includes a resistor or other impedance element.

In the OTG configuration, devices 630 and 640 may need to determine which device will be the host and which will be the client. This may be accomplished by having one or both devices assert a signal on the CP1 pins. In some configurations, CP1 may be set HIGH, indicating that it is a USB device. In other configurations, CP1 may be set LOW, indicating that it is a USB host. In still yet other configurations, CP1 may be floated, indicating that it is a USB OTG device. As shown, pathways 635 and 645 may be coupled to respective controllers (not shown) that may each assert (or not assert) that signal. Depending on the capabilities message exchange, the CP1 pin of an USB OTG device may be pulled LOW by the Rx unit, indicating that it is a USB host or the CP1 pin may be pulled HIGH by the Rx unit, indicating that it is a USB device. If a capabilities message indicates that both devices are configured as a USB host or as a USB device, the POC state machine will exit to the Beacon/Listen state. If a capabilities message indicates that a USB OTG device is connected to a USB host, the CP1 of the receiving device will be pulled HIGH indicating that it should be configured as a USB device. If a capabilities message indicates that a USB OTG device is connected to a USB device, the CP1 of the receiving device will be pulled LOW indicating that it should be configured as a USB host. As also shown, pathways 635 and 645 may be coupled to their respective devices.

When devices 630 and 640 attempt to form a link, one device may assert the CP6 pin on its Tx unit and the other device may leave the CP6 pin floating. Pathways 637 and 647 are coupled to respective controllers (not shown). In one embodiment, a controller associated with device 630 may drive the CP6 pin HIGH on Tx unit 634 to initiate a link, and a controller associated with device 640 may leave the CP6 pin floating on Tx unit 642. In this embodiment, the CP6 pin may be driven by Rx unit 644. Thus, in this embodiment, the wake up loop can start at Tx unit 634 and move clockwise to Rx unit 644, Tx unit 642, and continue at Rx unit 632. In the same manner, a wake up loop can start in FIG. 5 at Tx unit 514 and move clockwise to Rx unit 524, Tx unit 522, and continue at Rx unit 512.

Figure 7:
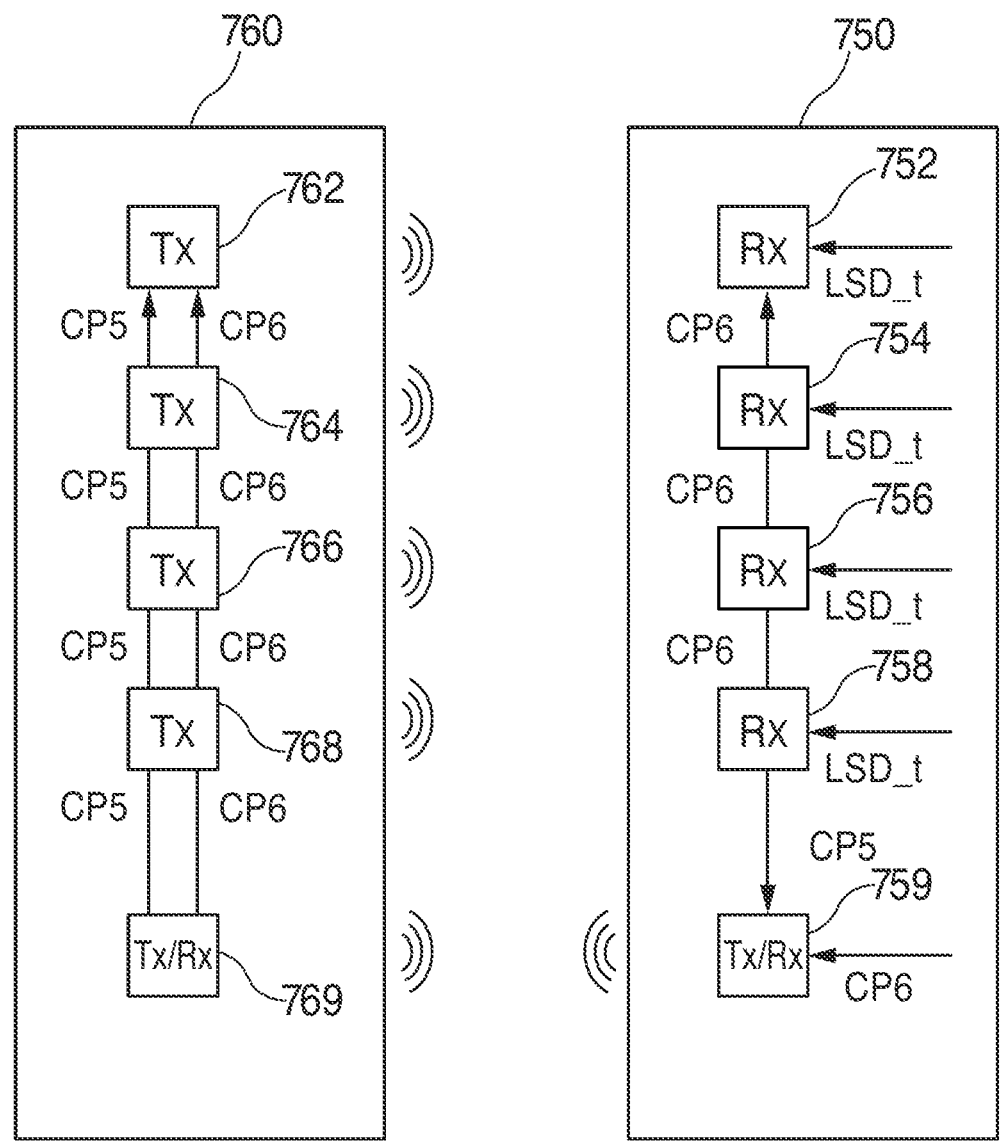
FIG. 7 is yet another illustrative system including several EHF communication units arranged in a wake up loop, according to an embodiment.

The wake up loops of FIGS. 5 and 6 are both single lane full duplex links. If desired, multiple lane links can be achieved by using multiple instances of the single lane full duplex links of FIG. 5 or FIG. 6. For example, a two lane link can be achieved by using two instances of the full duplex links of FIG. 5. FIG. 7 shows an illustrative multi-lane link according to an embodiment. In some embodiments, the link of FIG. 7 may be a multi-lane DP link. As shown, device 750 can include Rx units 752, 754, 756, and 758, and Tx/Rx unit 759, and device 760 can include Tx units 762, 764, 766, and 768, and Tx/Rx unit 769. In device 760, CP5 and CP6 pins of Rx unit 769 are fanned out to each of Tx units 762, 764, 766, and 768. In device 750, the CP5 pins of Rx unit 758 and Tx/Rx unit 759 are coupled together, and the CP6 pin of Tx/Rx unit 759 can be driven by a controller (not shown). The wake up loop of FIG. 7 may start with Tx unit 759, and proceed clockwise to Rx unit 769, and then the loop proceeds to each of Tx units 762, 764, 766, and 768 substantially simultaneously, followed by and ending substantially simultaneously with Rx units 752, 754, 756, and 758. Rx unit 758 may be the sole unit that communicates with Tx unit 759 via the CP5 pins. For simplicity, only a few of the interconnected signals are shown to prevent overcrowding of FIG. 7.

Yet another approach to establishing an EHF communications link between two EHF communication units can include a wake up loop that only requires two EHF communication units to establish an EHF communications link. This approach eliminates the need for a wake up loop to use both wired and contactless connections to communicate data and signals between EHF communications units. Thus, in this approach the two EHF communication units may directly communicate with each other using contactless EHF signals to establish the link.

Figure 8:
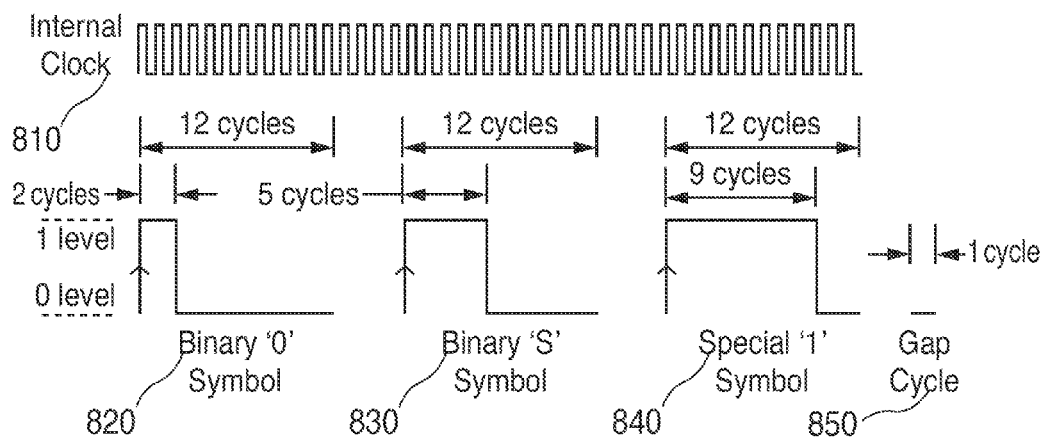
FIG. 8 shows three different and illustrative symbols that are serialized according to an internal clock, according to an embodiment.

Reference is now made to FIGS. 8-13 to discuss one of several different approaches for communicating a capabilities message in accordance with various embodiments. When an EHF communication unit is operating as a Tx unit in the capabilities message state, it may transmit a repeating stream of messages until it receives a rising edge on its CP5 pin or if some other condition occurs. An Rx unit, when operating in the capabilities message state, may wait to receive at least 2 consecutive copies of a valid message before transitioning to the next state. The message may be transmitted as PWC symbols and serialized according to a clock running within the unit. Each symbol can span a fixed number of clock cycles, begin with a rising edge, end with a falling edge, and terminate with a 0 level. FIG. 8 shows three different and illustrative symbols that are serialized according to internal clock 810.

FIG. 8 shows symbols 820, 830, and 840 each including a rising edge, a falling edge, and terminating with a 0 level. For illustrative purposes, each symbol may span 12 clock cycles, though it will be appreciated that the symbols may span any suitable number of clock cycles.

The symbols can be expressed according to a binary value in each clock cycle. For example, symbol 820 may express a binary '0' symbol, symbol 830 may express a binary 'S' symbol, and symbol 840 may express a binary '1' symbol. Symbol 820 may include two clock cycles of 1 level binary values, followed by ten clock cycles of 0 level binary values such that a binary '0' symbol can be represented by 110000000000. Symbol 830 may include five clock cycles of 1 level binary values, followed by seven clock cycles of 0 level binary values such that a binary 'S' symbol can be represented by 111110000000. Symbol 840 may include nine clock cycles of 1 level binary values, followed by three clock cycles of 0 level binary values such that a binary '1' symbol can be represented by 1111111111000. Symbols may be gapped by gap cycle 850, which may not represent a symbol, but can be expressed as a 0 level between symbol expressions. Each gap cycle 850 may span, for example, one clock cycle. It is understood the binary expression of each symbol is merely illustrative and that any binary expression may be used for any symbol. It should be understood that other variations of capability messaging is possible. For example, unique control symbols or characters may be sent in the form of digital bits without specifically using PWC.

Figure 9A:
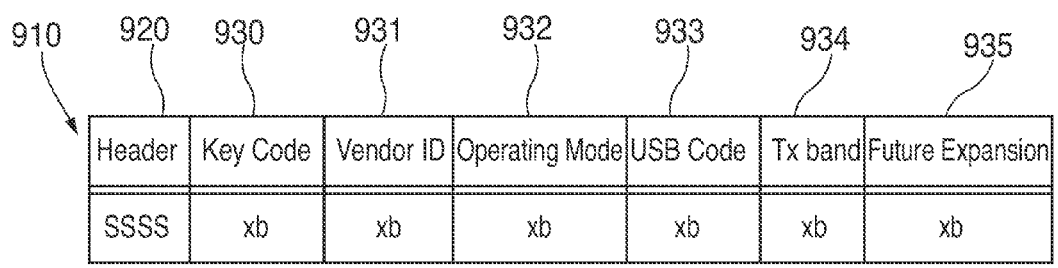
FIGS. 9A and 9B show illustrative formats of a capabilities message according to various embodiments.

The Rx units may be tolerant in accepting clock cycle mismatches of a fixed percentage of symbols being transmitted by a respective Tx unit. In a system in which there is no common clock or clock recovery mechanism, the tolerance in clock cycle mismatches allows a Tx and Rx to be mismatched in clock frequencies and still reliably communicate. For example, a Rx unit may interpret received messages having 1-3 level 1 clock cycles as an 820 symbol, 4-6 level 1 clock cycles as an 830 symbol, and 7-11 level 1 clock cycles as an 840 symbol FIG. 9A shows an illustrative format of a capabilities message according to an embodiment. Capabilities message 910 can include several fields that can be populated with various symbols. As shown, message 910 can include header field 920, which may be populated with a fixed number of symbols, and several message fields 930-935, each of which may be populated with various sized bit lengths of symbols. Header field 920 may mark the start of a message. As an illustrative example, four 'S' symbols may define a header. Each of message fields 930-935 can be represented by any number of bits, shown as xb in FIG. 9A. As an example, message fields 930-935 may include 16 bits, 16 bits, 16 bits, 2 bits, 2 bits, and 28 bits, respectively. The bit lengths are merely illustrative and any bit length may be used for any one of fields 930-935. Message field 930 may specify a key code, which may represent a cipher, an encryption code, or other security related code that may be verified by a counterpart device. For example, message field 930, entitled 'key code', may specify a key that can be used to authenticate the USB EHF Tx to the Rx. Message field 931 may specify vendor identification. The vendor identification may be stored in a register, read only memory, non-volatile memory, or some other permanent storage mechanism within the EHF communication unit. Message field 932 may specify an operating mode (e.g., USB operating mode) of the EHF communication device. The operating mode may specify the data transport mode (e.g., USB, PCI express, etc.) of the EHF communication device that is set by the states on one or more of the configuration pins (e.g., pins 308-311). In some embodiments, the operating mode may be defined according to configuration pin settings of FIG. 3. Message field 933 may specify a particular USB mode functionality (e.g., whether unit is a host or a slave and USB OTG functionality). Message field 934 may specify a transmission band, which may refer to the specific carrier frequency or carrier frequency offset. Message field 935 may be a future expansion field that can be used to communicate additional capabilities information for a future application. If desired, message field 935 may be split into two or more fields for future use. It is understood that some of the fields may not be used for certain applications, that some fields may not exist, and other fields may be included that are not part of capabilities message 910.

Figure 9B:
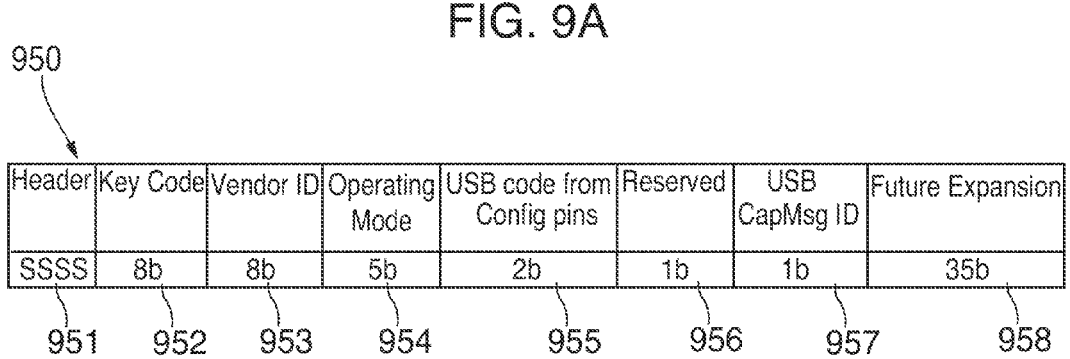

FIG. 9B shows an illustrative format of a USB capabilities message 950 that may be received by a EHF Rx unit according to an embodiment. Capabilities message 950 can include several fields that can be populated with various symbols. As shown, capabilities message 950 can include a header field, which may be populated with a fixed number of symbols, and several message fields, each of which may be populated with various sized bit lengths of symbols. Header field 951 may mark the start of a message. As an illustrative example, four 'S' symbols may define a header. Each of message fields 952-958 can be represented by any number of bits. As an example, as shown, message fields 952-958 may include 8 bits, 8 bits, 5 bits, 2 bits, 1 bit, 1 bit and 35 bits, respectively. The bit lengths are merely illustrative and any bit length may be used for any one of fields. Message field 952, may specify a key that can be used to authenticate the USB EHF Tx to the Rx. Message field 953 may specify vendor identification. The vendor identification may be stored in a register, read only memory, non-volatile memory, or some other permanent storage mechanism within the EHF communication unit. Message field 954 ('Operating mode') may specify an USB operating mode of the EHF communication device. The operating mode may specify the data transport mode (e.g., USB, PCI Express, etc.) of the EHF communication device that is set by the states on one or more of the configuration pins. In some embodiments, the operating mode may be defined according to configuration pin settings, and stored in field 955. Message field 956 may be a reserved field. Message field 957 'USB CapMsg ID' may be used to identify one of two capabilities messages communicated by the EHF unit implementing USB. In one embodiment, a second capabilities message, CapMsg2 may be specified by the USB CapMsg ID field, and the CapMsg2 may identify particular USB mode functionality (e.g., whether unit is a USB 3.0 or a USB 2.0 unit). In another embodiment, the particular USB mode functionality may be communicated in the same capabilities message with the use of additional bits in the message. Message field 958 may be a future expansion field that can be used to communicate additional capabilities information for a future application. If desired, message field 958 may be split into two or more fields for future use. It is understood that some of the fields may not be used for certain applications, that some fields may be reserved, and other fields may be included that are not part of capabilities message 950.

Figure 10:
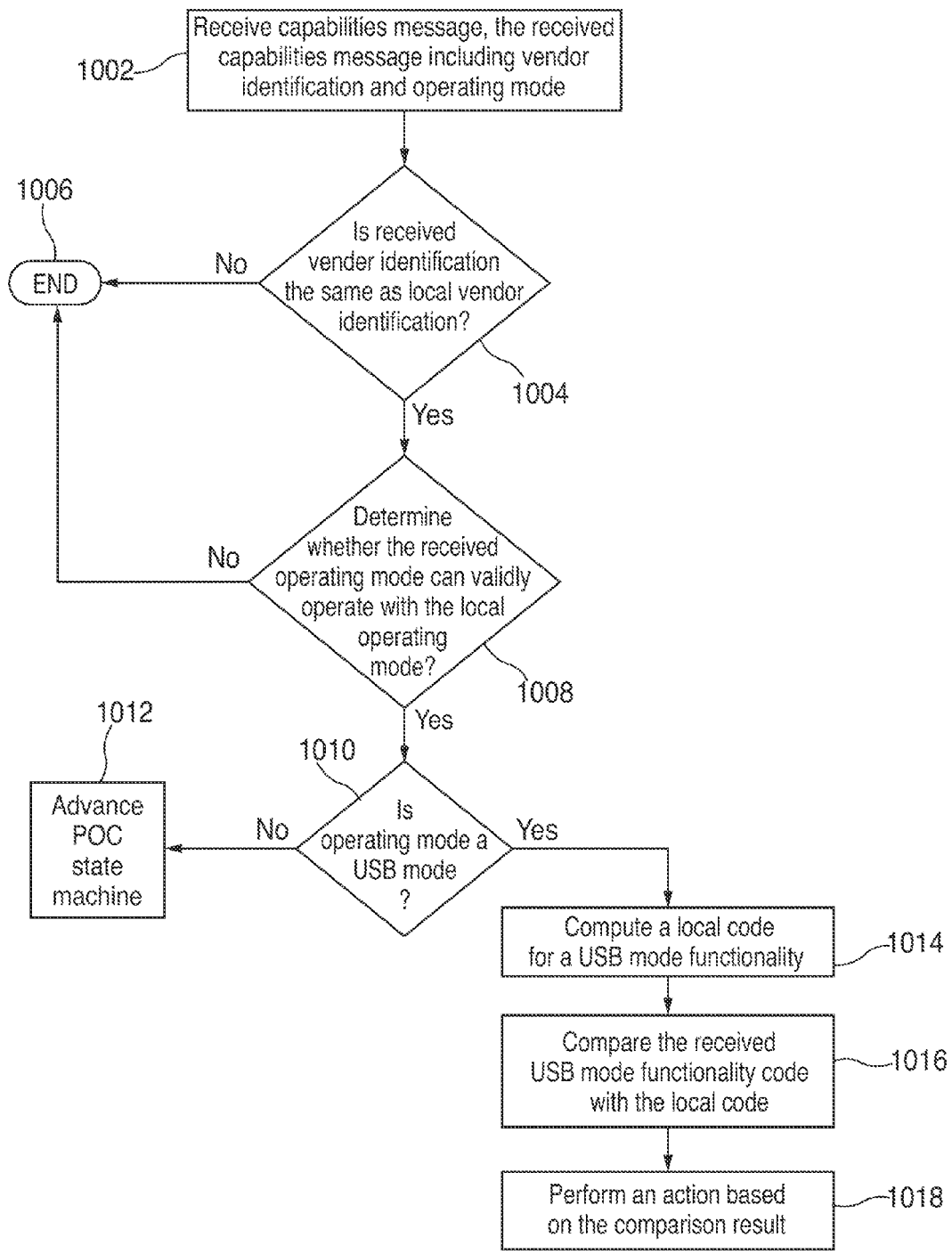
FIG. 10 shows an illustrative flowchart of steps that may be taken by a receiver unit that is processing a received capabilities message according to an embodiment.

FIG. 10 shows an illustrative flowchart of steps that may be taken by a Rx unit that is processing a received capabilities message according to an embodiment. Beginning with step 1002, a capabilities message may be received. The capabilities message may be transmitted by a counterpart Tx unit according to capabilities messaging format. As such, the received capabilities message may include a key code, vendor identification, and an operating mode. If the operating mode is a USB mode, the capabilities message may also include USB functionality information. The Rx unit may have stored therein, or programmed therein, its own local capabilities message information. For example, the Rx unit may have vendor information, operating mode information, and optional USB functionality information. At step 1004, a determination is made as to whether the received vendor identification is the same as the local vendor identification.

If they are not the same, the process proceeds to step 1006, and if they are same the process proceeds to step 1008. At step 1006, verification of the capabilities message may cease, thereby causing the POC state machine to exit out of its progression and restart.

At step 1008, a determination is made as to whether the received operating mode can validly operate with the local operating mode. In some applications, the received operating mode and local operating mode may be the same, which would result in a valid operation among the received and local operating modes. In other applications, the received and local operating modes may be different, such as is the case with various USB modes. Some different USB modes may validly work together and others may not.

FIG. 11 shows an illustrative table showing which USB modes validly work together and which do not. The EHF communication unit may access this table when making the determination at step 1008. As shown in FIG. 11, there is a Received Mode column, a Local Mode column, and a Result column. The Result column indicates whether the USB modes identified in the same row can validly work together. The USB modes can include USB 2.0, USB 3.0, and USB 3/2 Auto. USB 3/2 Auto may be a switchable USB mode that automatically resolves to use either USB 2.0 or USB 3.0 depending on various factors. The table in FIG. 11 can further include other USB modes such as USB OTG device or host functionality modes.

Referring back to FIG. 10, if, at step 1008, the determination is that both modes cannot validly work together, the process proceeds to step 1006, where the capabilities verification ends. If the determination is that both modes can operate together, the process proceeds to step 1010. At step 1010, a determination is made as to whether the operating mode is a USB mode. If the operating mode is not a USB mode, the process proceeds to step 1012. At step 1012, the received capabilities message may be considered verified and the POC state machine may be advanced to the next transition state (e.g., hold state, followed by the data transport state). If, at step 1010, it is determined that the operation mode is a USB mode, the process may proceed to step 1014.

If, at step 1010, it is determined that the operation mode is a USB mode, the POC state machine may advance to a Second Capabilities Message process beginning at step 1014. At step 1014, the receiver unit may compute a local code for its USB functionality mode. This local code may represent whether the device is a USB client, USB host, USB OTG client, or USB OTG host. This local code may occupy the USB functionality field of a capabilities message. The receiver may calculate its local code by sampling the states of one of the configuration pins (e.g., pin 308) during different stages of the POC state machine and comparing the sampled states to compute the local code. For example, the unit may register the state of one of the configuration pins (e.g., pin 308) during the attentive state and the capabilities message state. The registered states are compared to compute the local code. FIG. 12 shows an illustrative lookup table that may be accessed to compute the local code.

Referring now to FIG. 12, values are shown for the configuration pin in the attentive state and the capabilities message state. The values can include 0, 1, FLOAT, and X, which may be akin to a "don't care". Thus, as shown, when the pin is 0 at attentive, the computed code may be 00. In another case, when the pin is 1 at attentive, the computed code may be 01. In these two cases, the value of the pin at capabilities message state is not taken into account. If the pin is FLOAT at attentive state and 1 at capabilities message state, then the computed code may be 11. If the pin is FLOAT at attentive state and 0 or FLOAT at capabilities message state, then the computed code may be 10. The computed code can specify the USB mode functionality of the EHF communication unit and its active connection to a host device. For example, local code of 00 may indicate USB host only mode, a local code of 01 may indicated a USB client only mode, a local code of 10 may indicate an OTG Host mode, and a local code of 11 may indicate an OTG client mode.

It should be appreciated that a Tx unit may access the same table as shown in FIG. 12 to determine its USB mode functionality. Upon computing its USB mode functionality, it may include the appropriate code in the capabilities message it transmits to the Rx unit. In particular, it may include that code in message field 933 of message 910.

Referring back to FIG. 10, at step 1016, the received USB mode functionality code is compared to the local USB functionality code. Then, at step 1018, an action may be performed based on the comparison of the received code and the local code. For example, FIG. 13 shows illustrative actions that may be taken based on comparisons of the received code and the local code. As shown, some of the comparison results can result in determination of an invalid capabilities message, which can cause the POC state machine to drop out of the capabilities message state and revert back to beacon/listen state. As also shown, some of the comparisons can result in determination of a valid capabilities message. Responsive to a valid capabilities message, the POC state machine may advance to the next state (e.g., hold off state and/or data transport state). Some actions may also include driving one of the configuration pins (e.g., pin 308) to a logic 0 or 1.

It is understood that the steps shown in FIG. 10 are merely illustrative and that the order in which steps are performed can be rearranged, additional steps may be added, and steps may be omitted. For example, steps may be added to compare a received key code to a local key code to assess the validity of the received capabilities message. In addition, additional authentication may be performed during the capabilities message state. For example, determination of a valid USB operating mode between upstream and downstream EHF units may further involve a second capabilities message state in the POC, referred to as CapMsg2.

Figure 14A:
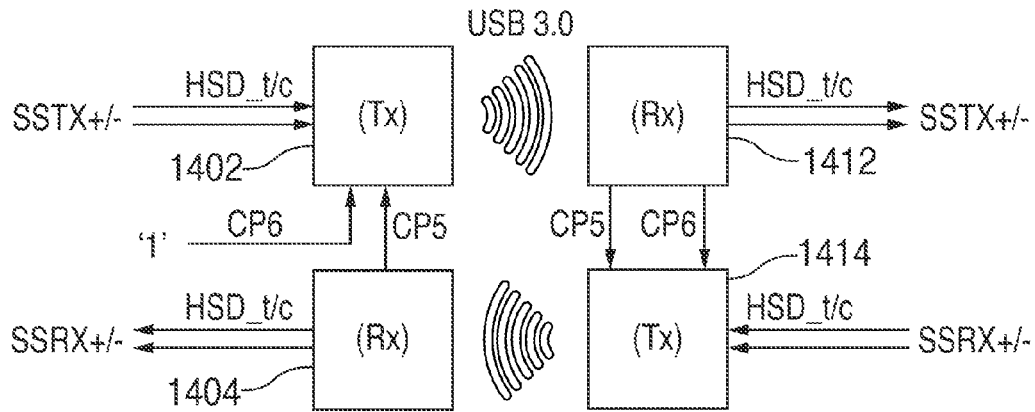
FIGS. 14A-14C show different connection diagrams for EHF chips configured to operate according to one of several different USB modes according to various embodiments.
Figure 14B:
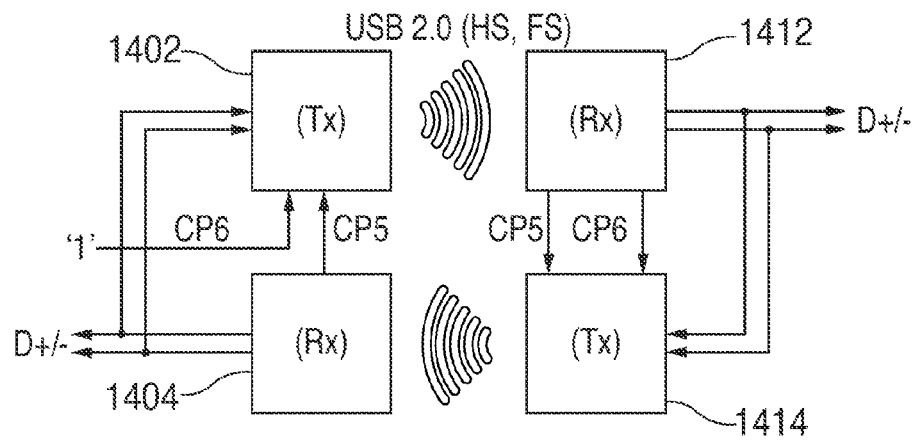
Figure 14C:
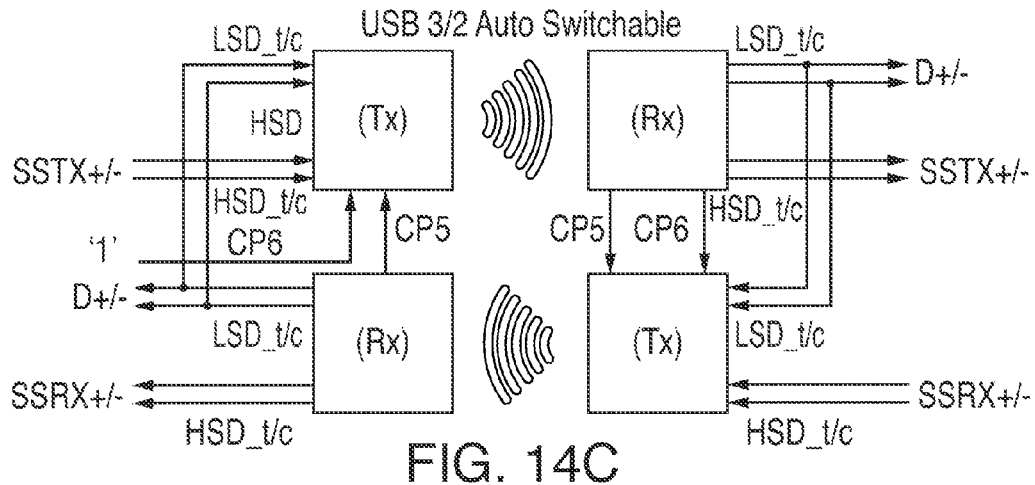

FIGS. 14A-14C show different connection diagrams for EHF chips configured to operate according to one of several different USB modes according to various embodiments. FIG. 14A shows an illustrative connection diagram for a USB 3.0 transport mode. As shown, the high speed data pins are being utilized by each EHF unit. In particular, Super Speed (SS) transmission data, shown as SSTX+/−, may be provided to Tx unit 1402 via those high speed pins. Unit 1402 may contactlessly transmit that data to receiver unit 1412, which outputs that data via its high speed pins. SS receive data, shown as SSRX+/−, may be provided to Tx unit 1414 via high speed pins. Tx unit 1414 may contactlessly transmit that received data to Rx unit 1404, which outputs that data via its high speed pins. CP5 and CP6 pins can be wired as shown.

FIG. 14B shows an illustrative connection diagram for a USB 2.0 data transport mode. As shown, the low speed data pins are being utilized by each EHF unit. In particular, transmission data, shown as D+/−, may be provided to Tx unit 1402 via those low speed pins. Unit 1402 may contactlessly transmit that data to Rx unit 1412, which outputs that data via its low speed pins. Rx data, shown as D+/−, may be provided to Tx unit 1414 via low speed pins. Tx unit 1414 may contactlessly transmit that received data to Rx unit 1404, which outputs that data via its low speed pins. The low speed pins, CP5 and CP6 pins, can be wired as shown.

FIG. 14C shows an illustrative connection diagram for a USB 3/2 Auto Switchable data transport mode. As shown, the connection diagram may be a combination of both USB 3.0 and 2.0 transport modes. The high speed pins, low speed pins, CP5 and CP6 pins, can be wired as shown. Additional details for USB auto resolution can be found in the discussion associated with FIG. 18.

Figure 15:
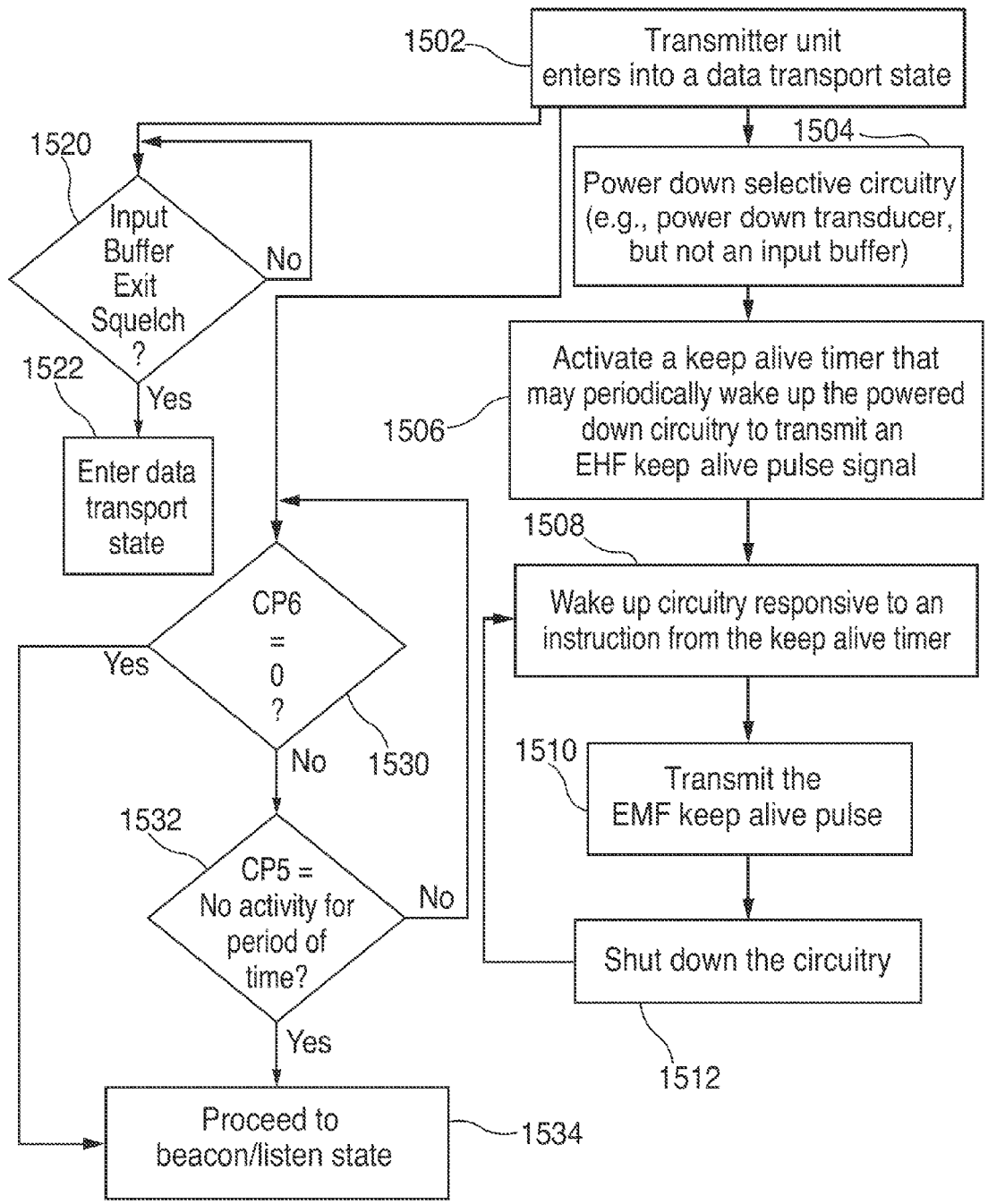
FIG. 15 shows an illustrative flowchart of steps that may be taken by a transmitter unit during a data transport idle state, according to an embodiment.
Figure 16:
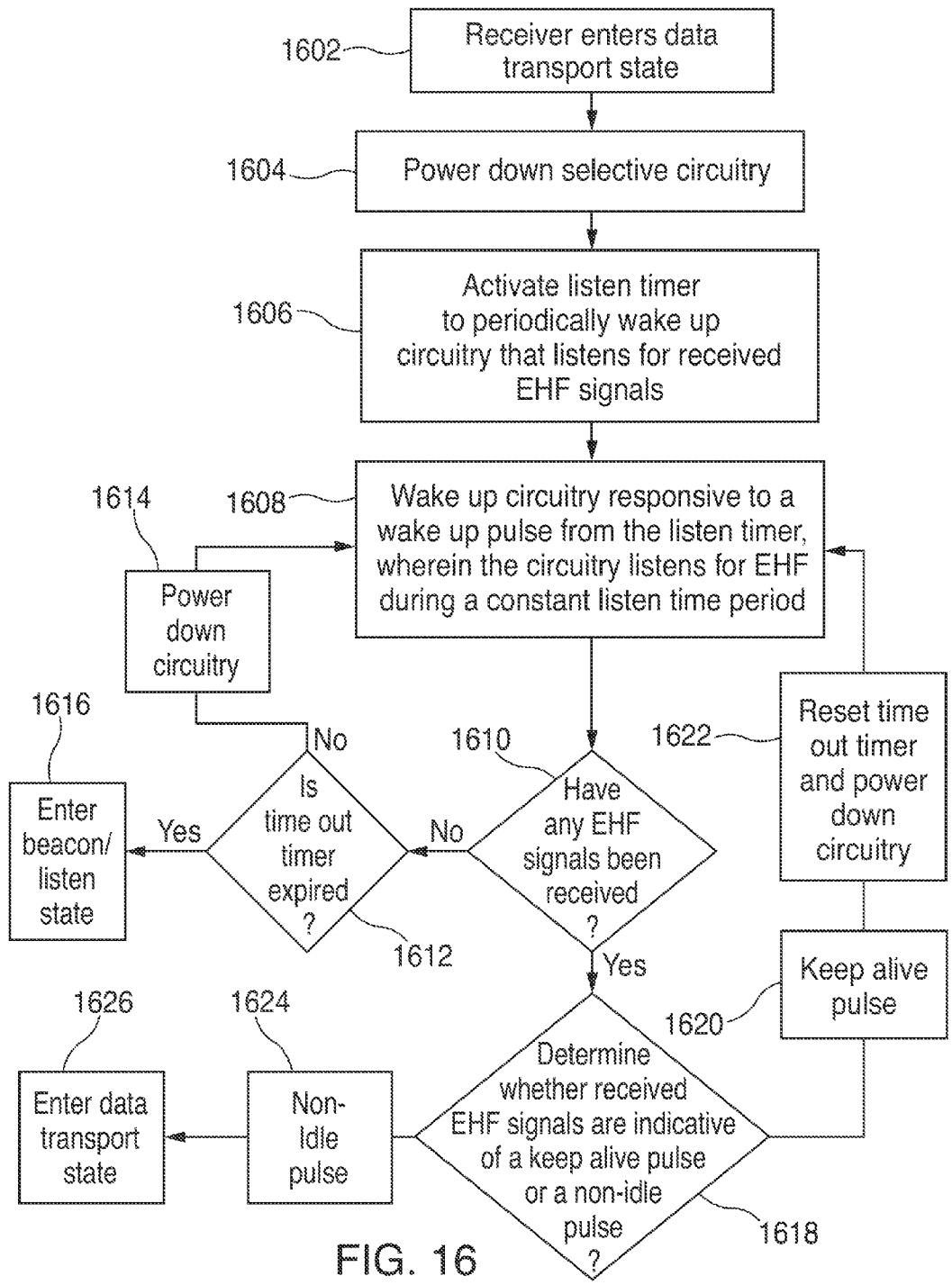
FIG. 16 shows an illustrative flowchart of steps that may be taken by a receiver unit during a data transport idle state, according to an embodiment.
Figure 17:
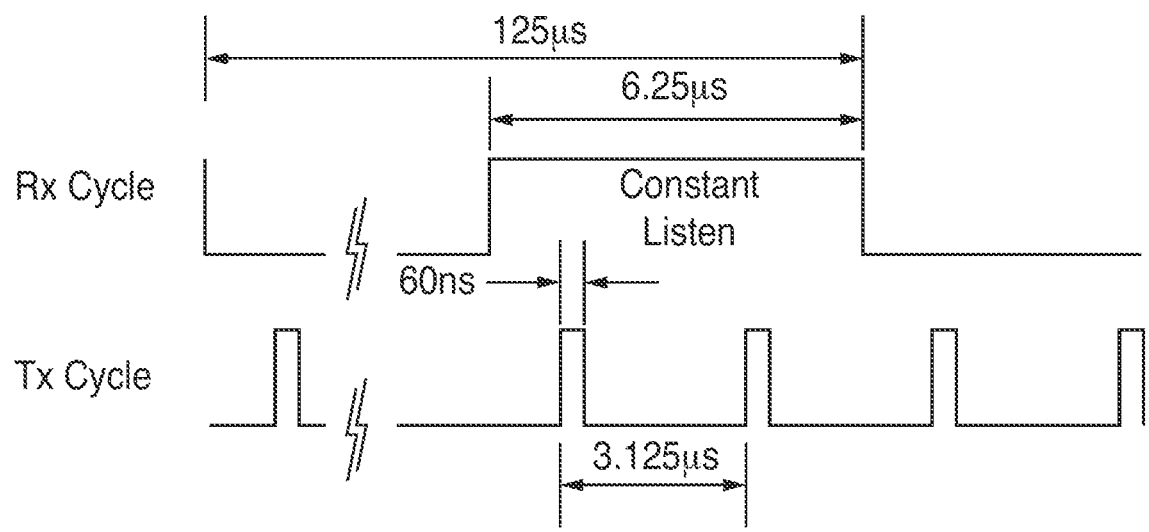
FIG. 17 shows illustrative timing diagrams of a data transport idle keep alive cycle, according to an embodiment.

Reference is now made to FIGS. 15-17 to discuss in more detail the data transport idle state according to various embodiments. FIG. 15 shows an illustrative flowchart of steps that may be taken by a Tx unit during the data transport idle state. FIG. 16 shows an illustrative flowchart of steps that may be taken by a Rx unit during the data transport idle state. FIG. 17 shows illustrative timing diagrams of a data transport idle keep alive cycle. In general, as previously discussed above, the data transport idle state may enable quick entry and exit low power states for one or more data transport modes (e.g., USB 2.0, USB 3.0, and DP).

Beginning with step 1502 in FIG. 15, a Tx unit may have entered into a data transport idle state. The conditions for entering into the data transport idle state were discussed above in connection with FIG. 4. At step 1504, various circuitry, including circuitry operative for transmitting EHF signals, may be selectively powered down. For example, the EHF transceiver (e.g., transceiver 320) may be powered down, but an input buffer (e.g., high speed circuitry 320) may remain powered on. In some embodiments, the circuitry being shut down can be the same circuitry that is powered down during when the unit is in the beacon/listen state 410. Then, at step 1506, a "keep alive" timer may be activated. The "keep alive" timer may periodically wake up the powered down circuitry to enable that circuitry to transmit an EHF "keep alive" pulse signal (discussed below). At step 1508, circuitry may wake up responsive to an instruction from the keep awake timer, and at step 1510, that circuitry may transmit the EHF "keep alive" pulse. The EHF "keep alive" pulse may include a series of 1's that span a fixed number of clock cycles (e.g., 16 clock cycles) every fixed period of time (e.g., every 3.125 µs). Examples of this EHF "keep alive" pulse are shown in FIG. 17. After the EHF "keep alive" pulse is transmitted, the circuitry is shut down, as indicated by step 1512. After the circuitry is shutdown, the process may loop back to step 1508. The Tx unit may continue transmitting EHF "keep alive" pulses until it returns to the data transport state 418 or the beacon/listen state 410. These transitions are now discussed.

The flowchart may have two other loops that are running concurrent with the "keep alive" timer loop. For example, one of the other loops transitions to step 1520 from step 1502. At step 1520, a determination is made as to whether an input buffer has exited squelch. For example, the Tx unit may determine whether its high speed or low speed input buffers have exited squelch. If not, the process loops back to step 1520. If data is received, the Tx unit may enter into the data transport state 418.

The other one of the loops begins at step 1530. At step 1530, a determination is made whether the Tx unit's CP6 pin has gone to '0'. If not, the process proceeds to step 1532, which determines whether the Tx unit's CP5 pin has remained at 0 for a certain predefined period of time. If not, the process proceeds back to step 1530. If, at step 1530, the determination was yes, the process may proceed to step 1534, which may cause the unit to enter into the beacon/listen state 410. If, at step 1532, the determination is yes, the process may proceed to step 1534.

Beginning with step 1602 in FIG. 16, an Rx unit may have entered into a data transport idle state. The conditions for entering into the data transport idle state were discussed above in connection with FIG. 4. At step 1604, various circuitry, including circuitry operative for detecting presence of EHF signals, may be selectively powered down. For example, the EHF transceiver (e.g., transceiver 320) may be powered down, but an input buffer (e.g., high speed circuitry 320) may remain powered on. In some embodiments, the circuitry being shut down can be the same circuitry that is powered down during when the unit is in the beacon/listen state. Then, at step 1606, a listen timer may be activated. The listen timer may periodically wake up the powered down circuitry to enable that circuitry to listen for EHF signals. At step 1608, circuitry may wake up responsive to an instruction from the listen timer, such that the circuitry can listen for EHF signals during a constant listen time period every fixed period of time. The constant listen time period may be set by the listen timer. For example, the listen time may cause the circuitry to listen for EHF signals for 6.25 µs every 125 µs. An example of this receiver listen pulse is shown in FIG. 17.

At step 1610, a determination is made as to whether any EHF signals have been received. If no EHF signals have been received, the process may proceed to step 1612, which checks whether a time out timer has timed out. The time out timer may control whether Rx should transition to the beacon/listen state due to non-occurrence of EHF activity. Thus, if the time out timer has timed out, then the Rx unit may enter the beacon/listen state, as shown in step 1616, but if the timer has not timed out, the process may proceed to step 1614. At step 1614, the circuitry may be powered down, and the process may loop back to step 1608. If, at step 1610, EHF signals have been received, the process may proceed to step 1618.

At step 1618, a determination is made whether the received EHF signals are indicative of a "keep alive" pulse or a "non-idle" pulse. This determination may be based on a burst length of the received EHF signals. The received EHF signals may include a series of 1's and/or 0's that are grouped together to form a burst. If the burst length of the received signals exceeds a "non-idle" time threshold, then the received EHF signals may be classified as a "non-idle" pulse and the process can proceed to step 1624 and then enter into the data transport state, at step 1626. If the burst length of the received signals includes a burst of 1's that falls within a "keep alive" pulse time range, then the received EHF signals may be classified as a "keep-alive" pulse. The "keep alive" pulse time range may include a lower time bound and an upper time bound centered around the pulse length of the EHF "keep-alive" pulse signal. For example, if the pulse length of the EHF "keep-alive" pulse signal is 60 ns, the lower time boundary may be 40 ns and the upper time boundary may be 80 ns. The idle time threshold may be greater than the upper time boundary of the "keep alive" pulse range. For example, the idle time threshold may be 1.2 µs. Upon determining that the received EHF signals are "keep-alive" pulses, the process may proceed to step 1620, and then proceed to step 1622, which resets the time out timer, before looping back to step 1608.

FIG. 17 shows illustrative timing diagrams of an idle keep-alive cycle for both Tx and Rx units. The Tx cycle shows illustrative "keep-alive" pulses having a pulse width of about 60 ns every 3.125 µs. The Rx cycle shows illustrative listen cycle in which the Rx circuitry listens for EHF signals during the constant listen period for every listen cycle.

Figure 18:
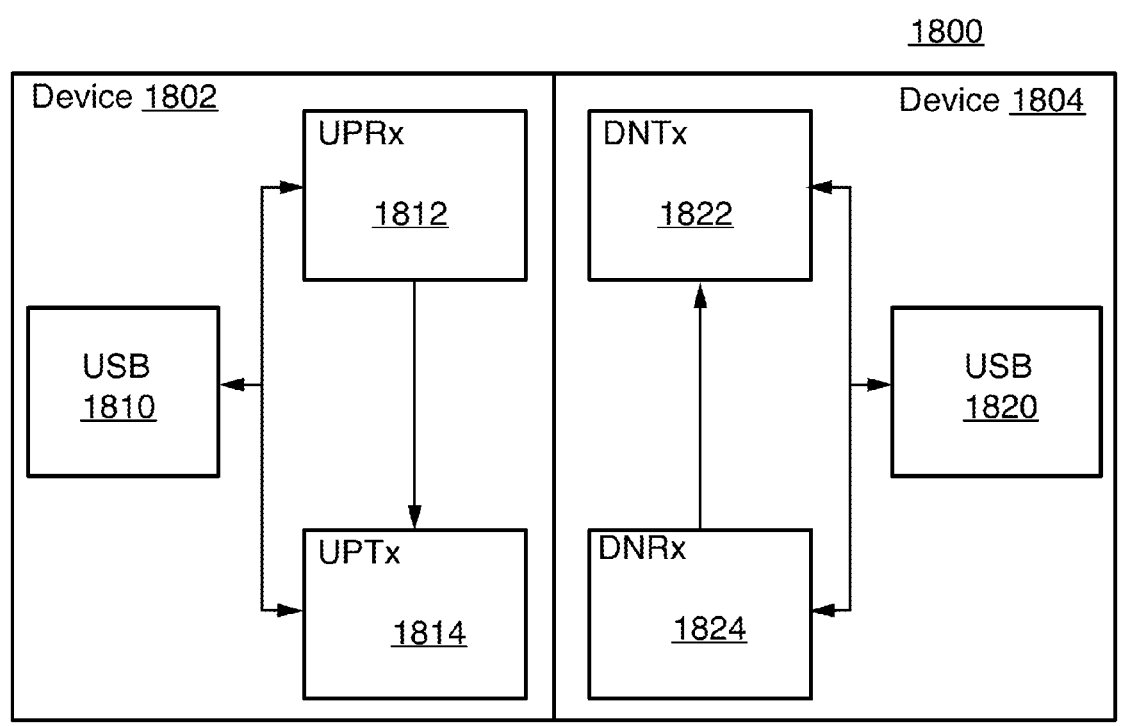
FIG. 18 shows an illustrative USB EHF communication system according to an embodiment.

FIG. 18 shows an illustrative USB EHF communication system 1800 according to an embodiment. System 1800 includes device 1802 (shown on the left side of FIG. 18) and a device 1804 (shown on the right side). Device 1802 can include USB portion 1810, an Upstream Rx (UPRx) EHF unit 1812, and an Upstream Tx (UPTx) EHF unit 1814, and device 1804 can include USB portion 1820, a Downstream Rx (DNRx) EHF unit 1824 and a Downstream Tx (DNTx) EHF unit 1822. USB portion 1810 can communicate with units 1812 and 1814, and units 1812 and 1814 may be physically connected with their CP5 pins. USB portion 1820 can communicate with units 1822 and 1824, and units 1822 and 1824 may be physically connected with their CP5 pins. Unit 1814 may communicate with unit 1824 via an EHF link, and unit 1822 may communicate with unit 1812 via an EHF link. Thus, an EHF loop exists among the EHF units, and can start, for example, at DNTx unit 1822, progress to UPRx unit 1812 via the EHF link, and then progress to UPTx unit 1814 via CP5 connection, and then progress to DNRx unit 1824 via the EHF link, and complete the loop by returning to DNTx unit 1822 via CP5 connection.

Devices 1802 and 1804 can be any logical or physical entity that performs one or more functions. The actual entity described depends on the context of the reference. At the lowest level, one or more of device 1802 and 1804 may represent a single hardware component, as in a memory device. At a higher level, one or more of devices 1802 and 1804 may represent a collection of hardware components that perform a particular function, such as a USB interface device. At an even higher level, one or more of devices 1802 and 1804 may represent an entity that encompasses a USB interface. Devices 1802 and 1804 may be physical, electrical, and/or logical. Devices 1802 and 1804 may be referred to herein as USB devices capable of communicating with each other using one of the USB protocol standards, such as USB 2.0 or USB 3.0.

USB portions 1810 and 1820 are included in devices 1802 and 1804, respectively, to represent the USB aspect of each device. The USB aspect can vary depending on the context in which its device is used. For example, in some embodiments, one or both of USB portions 1810 and 1820 can embody a USB interface. In other embodiments, one or both of USB portions 1810 and 1820 can embody a USB interface and a controller. For example, when both portions 1810 and 1820 embody a USB interface and a controller, the portions may negotiate which one is the host (i.e., an upstream device) and which one is the downstream device. In another embodiment, USB portion 1810 can embody a USB interface and controller and USB portion 1820 can embody a USB interface. In this embodiment, portion 1810 may serve as the host or upstream device, and portion 1820 can serve as a downstream device. The upstream and downstream references may be based on host and device orientation, as a host may generally be referred to as an upstream unit that directs the flow of data from or away from the host to a downstream device. It is understood that the upstream and downstream references (e.g., UPTX, UPRX, DNTX, and DNRX) are merely illustrative and are being used herein to simplify ease of discussion in referencing EHF units. For example, the upstream and downstream orientation can be reversed such that the downstream portion exists on the left side and the upstream portion exists on the right side.

FIG. 19A shows a table illustrating USB mode resolution based on USB controller modes of a USB host and a USB device that communicate with each over a contactless EHF link. The table in FIG. 19A is arranged in four columns, labeled Host Rx, Tx mode; Device Rx, Tx Mode; USB Mode Resolution; and Action Required to Achieve Resolution. The Host Rx, Tx Mode column may specify the USB mode of a USB portion designated as a host, and the Device Rx, Tx Mode column may specify the USB mode of a USB portion designed as a downstream device. The Tx and Rx associated with the host or device may both operate at the same USB mode associated with their respective host USB or device USB portions. For example, if the USB Host portion is configured for USB 3.0 only, then the Tx and Rx associated with that USB Host portion also operates at USB 3.0 only.

In some embodiments, the Tx units may follow the USB mode associated with the Rx unit. For example, the Rx unit may provide a CCRU USB capable parameter or a CCRU resolved USB parameter to a Tx unit over a wired path to specify the USB mode for which the Rx is currently configured. The CCRU USB capable parameter may specify which USB mode the Rx is capable of operating in based on, for example, the capabilities of the USB portion interfaced with the Rx unit. The CCRU resolved USB parameter may specify the resolved USB mode of the Rx device. For example, the process described in FIG. 10 above specifies how an Rx unit can resolves which USB mode to use as the data transport mode. Additional examples of how an Rx unit can resolve which USB mode to use are discussed below. The CCRU USB capable parameter can be any one of USB 2.0, USB 3.0, and USB 3/2 Auto, and the CCRU resolved USB parameter can be USB 2.0 or USB 3.0. Thus, depending on various factors in establishing the contactless link, the CCRU resolved USB parameter may be the same or different than the USB capable parameter. For example, the USB capable parameter may be 3/2 Auto, but the resolved USB parameter may be USB 2.0.

Regardless of which parameter is controlling the USB mode of the Rx unit, the Rx unit can communicate its USB mode to a Tx unit by driving different widths of pulses on the CP5 pin over a wired connection to enable the Tx unit to operate according to the same USB mode of the Rx unit. FIG. 19B, discussed in more detail below, shows illustrative pulses for informing the Tx of which USB mode the Rx is configured. This communication enables the Tx unit to follow the Rx unit, thereby ensuring that both units operate according to the same USB mode. It should be understood that communication of such a mode selection can also be accomplished by driving coded message bits on one or more pins used for communicating between the Rx and Tx. In another embodiment, the Rx unit may follow the Tx unit.

The USB Mode Resolution column specifies which USB mode is established as the data transport mode with the contactless communications link between the host and the device, and the Action Required to Achieve Resolution column specifies what action or actions may be performed by one or more communication units to achieve the result. The USB Mode Resolution column specifies a resolved USB mode based on the modes of the host and device. The resolved USB mode can be USB 3.0 or USB 2.0, or failure. Thus, the resolved USB mode may be the data transport mode used to transmit data over at least one contactless communications link between two devices (e.g., a host and a device). Each row of the table shows the USB mode resolution based on a comparison between the host and device modes. For example, when a USB host and USB device are both configured in a USB 3.0 only mode, the USB mode resolves to a USB 3.0 mode, and the action to arrive at this result can include operating according the "regular" capabilities message handling as described above in reference to FIG. 10. Similarly when both host and device Tx, Rx units are configured for USB 2.0 only modes, the result is a USB 2.0 link, and the same regular capabilities message handing is used. When the host mode is USB 2.0 only and the device mode is USB 3.0 only, the result fails. Similarly, when host mode is USB 3.0 only and the device mode is USB 2.0 only, the result fails and no EHF data transport mode is established.

When either or both the host and device operate in the USB 3/2 auto switchable mode, additional actions above and beyond the regular capabilities messaging may be used to resolve the USB mode. For example, when the host is configured in the USB 3.0 only mode and the device unit is configured in the USB 3/2 Auto switchable mode, the resolved USB mode is USB 3.0. Because the host's mode is USB 3/2 Auto, it may lock itself to USB 3.0 in order to resolve to USB 3.0. However, in order for the host to lock itself into USB 3.0, the Rx unit may check its USB portion (e.g., high speed input circuitry 320) to detect whether it is connected to a USB 3.0 interface. If the Rx detect passes, it may lock. If not, no USB mode is selected and it fails out. As another example, if a device is configured in the USB 2.0 only mode and the host device is configured in the USB 3/2 mode, the host may lock in at USB 2.0 to resolve to a USB 2.0 mode. If both the host and device are configured in the USB 3/2 auto switchable modes, then both the host and device may lock in at USB 3.0 if their respective Rx detect operations both pass. If either Rx detect operations fails or if the link fails and retries, then both the device and host may lock in at USB 2.0. Other combinations of Host and Device mode configurations in FIG. 19A are self-explanatory.

FIG. 19B shows a table illustrating which USB mode a Tx selects based on the type of signal received on at least one CP5 pin from its Rx. FIG. 19B also shows which USB mode will be incorporated into a capabilities message that is transmitted over a contactless communications path to a Rx. For example, when a Tx receives a standard pulse on its CP5 pin, the Tx can advertise a USB 3/2 capability and enter a USB 3.0 mode, at least initially. A USB Tx that receives a pulse that is twice (2×) the standard pulse on the CP5 pin can advertise a USB 3.0 capability and enter USB 3.0 data transfer mode. Finally, a USB Tx that receives a pulse that is 4 times the standard pulse on the CP5 pin can advertise a USB 2.0 only capability and enter USB 2.0 data transfer mode. It should be understood that the CP5 pulse durations shown in FIG. 19B are merely illustrative and that any suitable pulse duration may be used to represent a particular mode.

FIG. 19C shows an illustrative table describing the actions taken by a USB EHF Rx unit in the process of resolving the USB operating mode between a USB 3.0 and a USB 2.0 mode. The table shows an EHF Rx USB Capability column, USB capabilities received by the Rx in the Capabilities message, actions taken by the USB EHF Rx and the resulting operating mode chosen. A USB 3/2 Auto capable EHF Rx that receives a USB 3/2 Auto mode in the capabilities message can perform a Rx detect on its input circuitry (e.g., High Speed I/O (HSIO)). It may perform this operation a second time after waiting for a programmable period of time, if the first detect operation fails. If the Rx detect operation passes at either check, the EHF Rx may select USB 3 as the data transport mode and send a pulse on the CP5 pin that is twice the standard pulse. If the Rx detect operation fails both times, the EHF Rx may select USB 2.0 mode and send a pulse four times the standard pulse on the CP5 pin. As noted earlier, the different mode selections can also be communicated by a EHF Rx to its Tx using coded message bits on one or more pins.

A USB 3/2 Auto capable EHF Rx that receives a USB 3.0 mode in the capabilities message may select a USB 3.0 mode and send a two times the standard CP5 pulse to its Tx if the Rx detect check operation on its HSIO passes, in a similar manner to the one described above. If the Rx detect operation fails both times, then the connection attempt may be aborted. If the USB 3/2 Auto capable EHF Rx receives a USB 2.0 mode in the capabilities message, it can select USB 2.0 mode for data transport and send a four times the standard CP5 pulse to the Tx. It should be understood that the pulse durations of FIG. 19B are merely illustrative and that any suitable pulse duration may be associated with a particular result.

Figure 20:
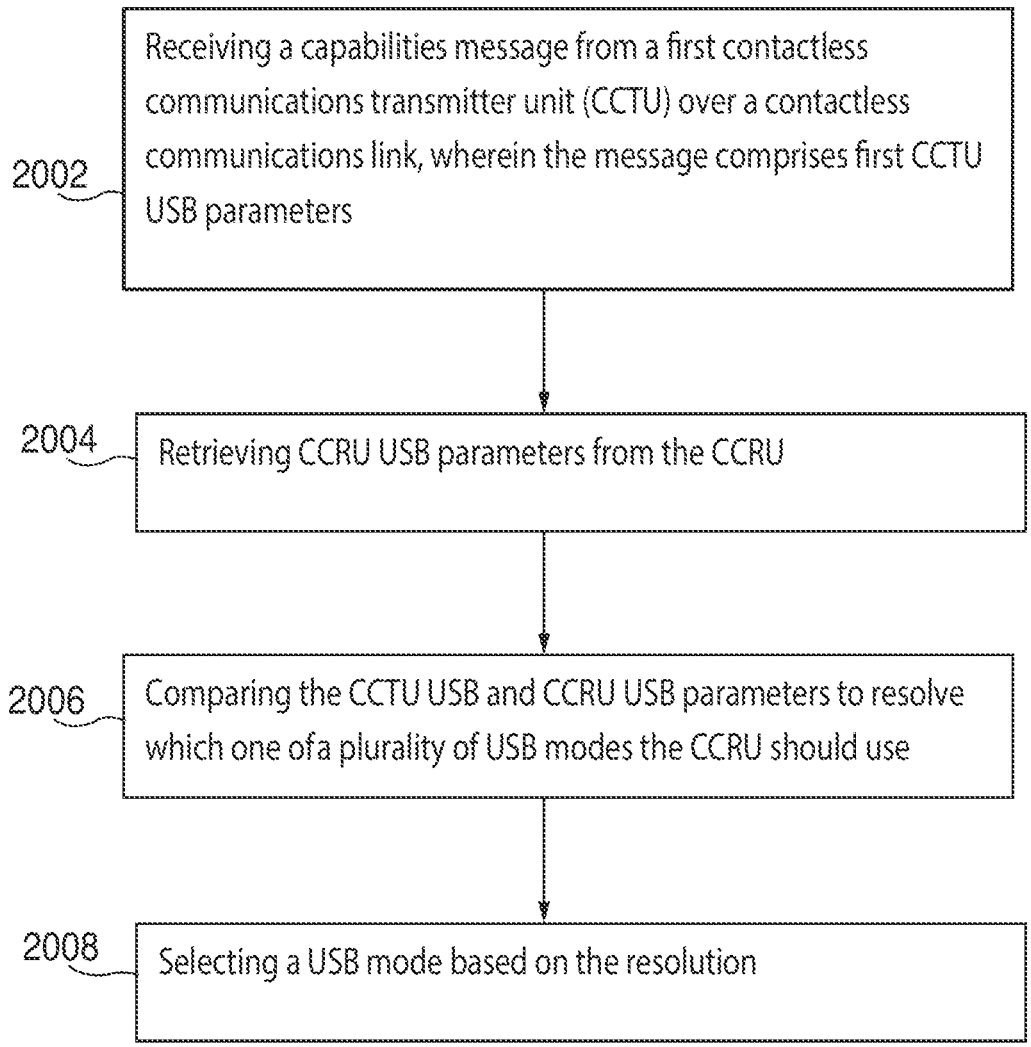
FIG. 20 shows an illustrative flowchart of steps that may be implemented by a contactless communications receiver unit (CCRU), according to an embodiment.

FIG. 20 shows an illustrative flowchart of steps that may be implemented by a CCRU according to an embodiment. The CCRU can be, for example, UPRx 1812 or DNRx 1824 of FIG. 18. Beginning at step 2002, a capabilities message may be received from a first CCTU over a contactless communications link. For example, the UPRx may receive a capabilities message from the DNTx over the EHF link. The capabilities message can include first CCTU USB parameters (e.g., of the DNTx). At step 2004, CCRU USB parameters can be retrieved. For example, the USB mode of the receiver can be obtained using the techniques described above in connection with FIGS. 4 and 9A, 9B, and 10-14. The CCRU USB and CCTU USB parameters can include USB 3.0, USB 2.0, and USB 3/2 Auto parameters. At step 2006, the CCTU USB and CCRU USB parameters are compared to resolve which one of a plurality of USB modes the CCRU should use. For example, the CCRU may resolve to the appropriate USB mode based on tables of FIGS. 19A and/or 19C. At step 2008, a USB mode is selected based on the resolution, where the selected USB mode can be one of USB 2.0, USB 3.0, or failed out. After the USB mode is selected, the CCRU (e.g., UPRx) may transmit a pulse corresponding to that mode to its CCTU (e.g., UPTx) over a wired connection (e.g., CP5 wire).

The CCRU may also determine whether it is associated with a host or a device. In some embodiments, a host can be a USB host only or a USB OTG host. In other embodiments, a device can be a USB device only or a USB OTG Device. The process for making the host versus device determination is discussed above in connection with FIG. 12, but a brief recapitulation is now provided. The CCRU can make the host/device determination by obtaining a value of a pin at a first CCRU state (e.g., attentive state), obtaining a value of that same pin at a second CCRU state (e.g., capabilities message state), and identify the appropriate host/device mode based on values of that pin at both states.

Figure 21:
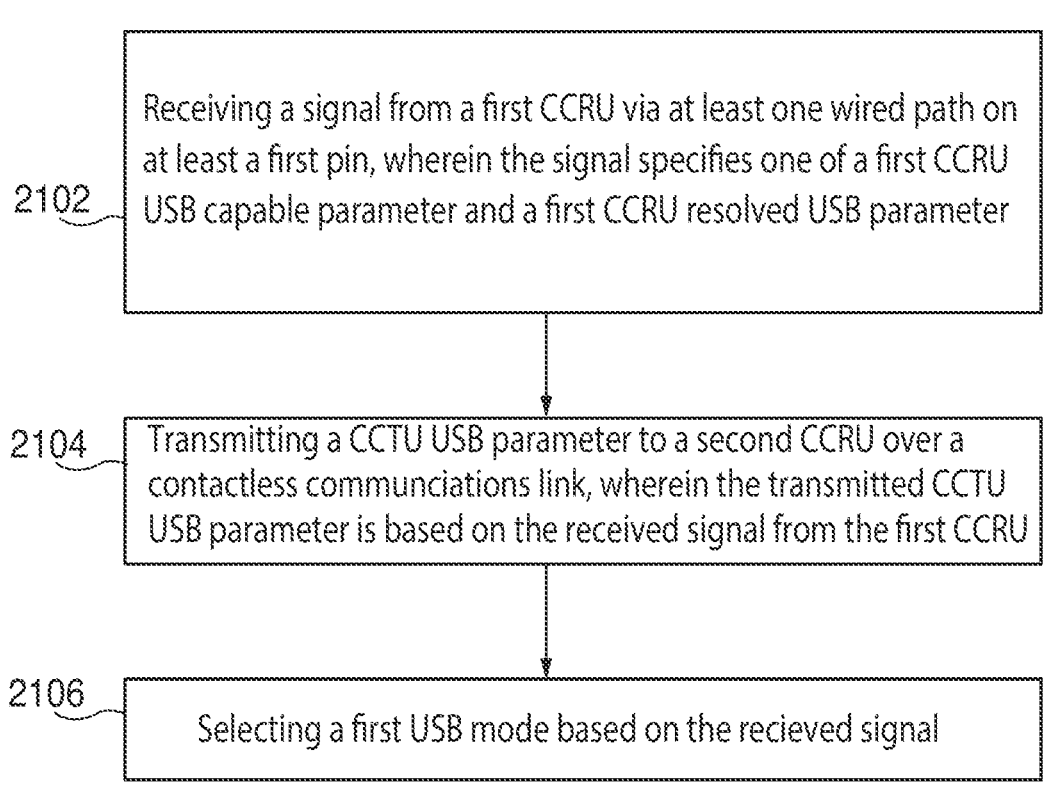
FIG. 21 shows an illustrative flowchart of steps that may be implemented by a contactless communications transmitter unit (CCTU), according to an embodiment.

FIG. 21 shows an illustrative flowchart of steps that may be implemented by a CCTU, according to an embodiment. The CCTU can be, for example, UPTx 1814 or DNTx 1822 of FIG. 18. Beginning at step 2102, a signal is received from a first CCRU (e.g., UPRx) via at least one wired path on at least a first pin (e.g., CP5), wherein the signal specifies one of a first CCRU USB capable parameter and a first CCRU resolved USB parameter. The first CCRU USB capable parameter can include USB 3/2 Auto, USB 3.0, and USB 2.0 and can be expressed in terms of pulse widths or bits that are selected by the first CCRU. For example, if the first CCRU is configured for USB 3/2 Auto mode, it may provide a standard CP5 pulse, according to FIG. 19B. The first CCRU resolved USB parameter can include USB 3.0 and USB 2.0. The first CCRU resolved USB parameter can be expressed in the same terms as the CCRU USB capable parameter. Both the capabilities and resolved USB parameters may be provided to account for potential changes in the USB mode ultimately selected by the first CCRU. For example, before the first CCRU resolves which USB mode to use, it may know what USB mode is capable of supporting, and it able to report this capability to the CCTU. However, after the first CCRU resolves its USB mode (based on the capabilities message it receives from another CCTU (e.g., DNTx), the USB mode it was potentially reporting to the CCTU could change.

At step 2104, a CCTU USB parameter is transmitted to a second CCRU (e.g., DNRx) over a contactless communications link, wherein the transmitted CCTU USB parameter is based on the received signal. For example, the CCTU may transmit the CCTU USB parameter based on the table in FIG. 19B. The CCTU USB parameter may be incorporated into a capabilities message, which is transmitted over the contactless communications link to a Rx. At step 2106, a first USB mode can be selected based on the received signal. For example, the CCTU may select the USB mode based on the table in FIG. 19B. The CCTU may determine whether to reselect the USB mode based on the received signal, and select a second USB mode if the first CCRU resolved USB parameter is different than the selected first USB mode.

FIG. 22 shows an illustration defining how FIGS. 22A-L should be read. FIGS. 22A-L are tables illustrating how the PI state machine can be implemented in each of the EHF units of system 1800 to enable data transport according to a USB 2.0 mode. The columns of the table specify the state taken by each of the EHF units, the condition(s) required to achieve that state, and any actions performed by the unit in response to satisfying the condition(s). As shown, each state corresponds to one of the EHF units of FIG. 18. The rows may correspond to different steps that are executed by the PI state machine. The table is arranged to show how state transitions progress around the EHF loop. A numeric suffix may be affixed to the states to indicate the order in which state transitions occur. The states of each PI state machine may changes in the same loop-like manner in which states of the POC state machine change.

Starting at step 2202, each of the EHF units are in a "wake" state to allow for discovery of D+ line being pulled high on the device side of the EHF loop. The interface state machine of each of the EHF units may be in the "wake" state after the POC state machine for a given EHF unit reaches the capabilities message state. At step 2204, DNTx detects an asserted D+ on its USB port (e.g., input circuitry) and transmits a 0 (or other suitable data) over its EHF link to UPRx. At this step, DNTx is in the DPLUS state. The EHF transmission of the 0 may be referred to herein as EHF0. At step 2206, if the UPRx receives the EHF0 from DNTx and receives a USB electrical SE0 on its USB port, UPRx may identify itself as the UPRx and transition to a DPLUS state. A SE0 may be a single-ended zero where both D+ and D− are pulled to ground. In addition, it may set its CP5 to 1. Then, at step 2208, if UPTx registers the 1 on its CP5 pin and receives a SE0 on its USB port, UPTx may identify itself as an UPTx and transition to a DPLUS state. In addition, it may transmit an EHF0. At step 2210, if DNRx receives an EHF0 while D+ is asserted on its USB port, may identify itself as the DNRx and transition to the DPLUS state. In addition, it may set its CP5 pin to 1. At the end of step 2210, all four EHF units are in the DPLUS state.

Although DNTx is shown to be the first Tx to detect an asserted D+, the UPTx could have been the first to detect an asserted D+ on its USB port. In this case, the upstream and downstream identifications may be different than that shown in FIGS. 22A-L.

After each of the EHF units are in the DPLUS state, the USB 2.0 PI state machine may transition each EHF unit to its respective DPLUSCONF state if the appropriate conditions are met. The suffix number appended to each DPLUSCONF (e.g., DPLUSCONF_1) indicates the progression order in which the transitions occur around the EHF loop. Starting at step 2212, DNTx transitions to DPLUSCONF_1 when its CP5 is driven to 1. When it transitions from DPLUS to DPLUSCONF_1, it may transmit a 1 on its EHF link (hereinafter referred to as EHF1) an EHF1. The EHF1 signal may be received by UPRx, which transitions to DPLUSCONF_2 state (as indicated at step 2214) in response thereto. After the transition, UPRx may drive its CP5 to 0. UPTx may see the 0 on its CP5 and transition to DPLUSCONF_3, and send an EHF1 signal over the EHF link (as indicated at step 2216). This EHF1 signal may then cause DNRx to transition to DPLUSCONF_4 (at step 2218). In addition, at step 2218, all four EHF units are in their respective DPLUSCONF states and have identified themselves as upstream or downstream units within the EHF loop. Furthermore, UPRx may enable its D+ port so that the USB host is made aware of the USB connection with the USB device. At this stage, the PI state machine may resolve which speed mode to use before proceeding. USB 2.0 has a full speed mode and a high speed mode. After the four transmitters have resolved their respective roles within the EHF loop, it may be assumed that various actions will originate from the host. For example, the host may originate the first start of packet (SOP) and the end of packet (EOP).

At step 2220, a determination is made as to whether to begin a full speed mode negotiation or a high speed mode negotiation. The determination may be based on whether the UPTx receives a USB "K" signal (or other suitable signal) from the USB host. A "K" can be provided by driving USB D+ line Low and D− line High). If a "K" is received, the PI state machine may proceed to step 2222 to start negotiation of the full speed mode. If no "K" is received and UPTx receives a SE0 on its USB port, the PI state machine may proceed to step 2250 to begin negotiation of the high speed mode. UPTx may be configured to asynchronously transmit any data or signals it receives over the EHF link, thereby reducing amount of time required for DNRx to detect and propagate the "K".

At step 2222, UPTx transitions to the FSPEEDsrc_1 state in response to receiving a "K" from the USB host processor and transmits a 0 over the EHF link to initiate the SOP of the full speed mode. At step 2224, DNRx receives the EHF0 of the SOP and transitions to the FSPEEDsnk_2. The DNRx may set its CP5 to 1. At this stage in the POC state machine, an asynchronous EHF link is established between UPTx and DNRx. Thus, any transitions on the EHF link can be transmitted asynchronously on its USB port. At step 2226, DNTx may transition to FSPEEDsnk_3 if it detects a "K" on its USB port (where the "K" is provided by the device USB processor), and transmit the "K" on the EHF link to UPRx. DNTx may check the state of its CP5 pin to determine whether the SOP was initiated by the USB host or the USB device. In this illustration, since it is assumed that USB host is the originator, CP5 is set to "1". If the USB device was the originator, CP5 would have been "0". At step 2228, when DNRx detects the EHF0, it may transition to FSPEEDsrc_4 and set it ICC to 1. As this point in the PI state machine, the "K" has propagated around the EHF loop. At this point, the EHF units are in the data transport state (based on their POC state machines) and data can be transmitted over USB/EHF contactless link.

At some point after the "K" has propagated around the EHF loop, the USB host may initiate an EOP. The EOP may include an SE0 or a USB electrical signal "J". When the EOP is received, a determination may be made (at step 2229) whether it includes an SE0 or a "J". If it includes SE0, the PI state machine may proceed to step 2230, and it includes the "J", it may proceed with step 2238. Steps 2230, 2232, 2234, and 2236 describe state transitions made in response to a SE0 EOP, and steps 2238, 2240, 2242, and 2244 describe state transitions made in response to a "J" EOP.

State transitions in response to a SE0 EOP are now discussed. At step 2230, when the SE0 EOP is detected by UPTx, it may transition to EOP1src_1 state and transmit the SE0 over its EHF link to DNRx. UPTx may be in a state where it continues to asynchronously transmit data over its EHF link. In one embodiment, the SE0 may represent EHF idle. At step 2232, when DNRx receives the SE0 via its EHF link, it may transition to EOP1snk_2 and change CP5 to 0. In addition, DNRx may provide the SE0 to its USB port to inform the USB device processor of the EOP. At step 2234, when the DNTx detects that CP5 is 0 and receives the SE0 from its USB device processor, it may transition to EOP1sink_3 and transmit the SE0 via its EHF link to UPRx. By sending the SE0, the DNTx confirms that SE0 is active on the device side. At step 2236, when UPRx receives the SE0 via its EHF link, it may transition to EOP1src_4 state and set its CP5 to 1. Thus, at step 2236, the SE0 has propagated around the EHF loop.

At step 2238, when the UPTx detects a "J" in the EOP from the USB host processor while its CP5 is 1, the UPTx may transition to EOP2src_1 state and transmit the "J" via its EHF link (as EHF1) to DNRx. As this point in the PI state machine, the UPTx may still be asynchronously transmitting data onto its EHF link. The DNRX may receive the EHF1 and transition to EOP2snk_2 and set CP5 to 1. At step 2240, DNTx may see that CP5 has changed to 1 and may transmit an EHF1 to UPRx. In addition, DNTx may inform its USB device processor of the "J". The UPRx, upon receipt of the EHF1, may transition to EOP2src_4 state and set CP5 to 0.

At step 2242, after UPTX detects that CP5 is 0 (e.g., which confirms that DNTx is driving a "J"), UPTx may transition to a FULLIDLE state. FULLIDLE may be defined as SE0 for 2-bit times followed by a "J". Since FULLIDE is the same as the DPLUS state, it may be difficult for the UPTx to know when the host USB processor has released the USB bus. As a result, UPTx may rely on the DPLUS resistor to pull up the D+ line. When UPTx and other units are in the FULLIDLE_1 state, USB data is no longer transmitted over the EHF link, and the EHF link is forced to IDLE. The FULLIDLE state propagates around the EHF loop in the order shown (at step 2244). The UPRx may maintain its D pull-up resistor to hold its USB port in the full-speed idle state.

Either the UPTx or DNTx device can initiate the transition out of FULLIDLE state, as shown by step 2246. When either detects a "K" signal on its USB port when CP5 is 0, that device can initiate a transition to FSPEEDsrc_1 state and transmit an EHF0 on its RF link. The receiving device can transition to FSPEEDsnk_2 state as described above. To reduce distortion of first symbol of SOP, the UPTx and/or DNTx device switches to the transmitting mode asynchronously after first detecting a "K" on USB, when CP5 is equal to 0. Although the symbol is passed immediately, state machines update later, when signals have been stable for several clock cycles.

If at step 2220, the UPTx receives an SE0 on its USB port from the USB host processor, the PI state machine proceeds to step 2250 to begin High Speed negotiation. UPTx may transition from the DPLUSCONF state to a High Speed POLL state if it detects an SE0 on its USB port when its CP5 is 0. In response to transitioning to the HSPOLL state, the UPTx may transmit a signal over its EHF link to DNRx to propagate the state change transition around the EHF loop. The propagation of the HSPOLL state may be executed in a manner similar to the FSPEED state transitions. After each device in the EHF loop has transitioned to the HSPOLL state, the UPTx may transition to a SE0CONF_1 state after it receives confirmation that UPRx has transitioned to the HSPOLL state, as shown by step 2250. After UPTx transitions to SE0CONF_1, it may transmit a signal to the DNRx to propagate the change around the EHF loop, which is also shown in step 2252.

When the units are in the SE0CONF state, the system continues to drive SE0 on the device side of the EHF link and wait for the USB device USB to respond with a USB ChirpK. A ChirpK is a signaling condition on the USB bus created when a high speed capable device drives a current of, for example, 17.78 mA into the D− line, while leaving the D+ line with a 1.5K pullup resistor (and without termination on the device side). If USB host times out before USB device responds with ChirpK, the PI state machine may return to USB DPLUS condition (due to device pull-up). As a result, the PI state machine can assume the USB link has failed to progress to High Speed, and will continue operation as a Full Speed link, thereby returning to step 2222. If the USB device responds with a ChirpK before USB host times out (at decision step 2253), the PI state machine may progress to the ChirpK states, starting with step 2254.

At step 2254, when the ChirpK is detected by DNTx, it transitions to the ChirpK state and transmits a signal over the EHF link to propagate the state change around the EHF loop. After the PI state machine in each EHF unit has transitioned to its ChirpK state, they may wait for the USB device processor to remove the ChirpK signal. When the device USB processor ceases to provide the ChirpK signal, this may be detected by the DNTx, which transitions to a NOCHIRPK_5 state and can cause the state change transition to propagate around EHF loop. This is shown in step 2256. The device USB processor may cease to provide the ChirpK signal to enable the USB host processor to drive transitions. If the USB host processor is not permitted to drive any transitions, then the device USB processor may not remove the ChirpK signal.

At step 2258, the USB host processor can provide alternating ChirpJ and ChirpK signals to the UPTx. A ChirpJ (similar to a ChirpK) is a signaling condition on the USB bus when the host/hub drives a current of 17.78 mA into the D+ line and leaves the D− line alone, with the D+ and D− lines having high speed termination at the hub/host and fill speed termination at the device. When the UPTx detects a ChirpJ, it may transition to its CHIRPJK_1 state, and it may cause the other units to change to their respective CHIRPJK states in the order of the EHF loop. Here, the USB host may send a series of alternating ChirpK and ChirpJ sequences. At this point in the PI state machine, the link from UPTx to DNRx may be multiplexed asynchronously to avoid jitter that may be caused when sampling the signal.

After each of the units enter the CHIRPJK state, they may wait for a SE0 signal in order to transition to a HSIDLE state, as indicated by step 2260. In HSIDLE, the DNRx unit may apply pulldown resistors on its USB link to maintain the state. UPTx and DNTx devices may be in a high-impedance state. If UPTx detects a "K" on its USB port with ICC equal to 0, then it may transition to HSPEEDsrc_1, as indicated by step 2262. The other EHF units may transition to HSPEEDsrc/snk states progressively as illustrated for FSPEEDsrc and FSPEEDsnk states. If DNTx detects a K with CP5 at 0, then it transitions to HSPEEDsrc_1 state first, and remaining USB EHF units transition states progressively around the EHF loop. State transitions to the HSPEEDsnk or HSPEEDsrc states can use signals which have been synchronized to an internal clock domain. However, the USB FSM would violate the USB spec if the transitions were to occur in that time frame. In order to pass data more quickly across the EHF link to the USB links, there is an asynchronous path for the data, just like in the FSPEED case (described above). Flip-flops may be used register the USB data asynchronously. This USB data is (i) immediately driven onto the EHF link to meet the timing requirements of the USB standard, and (ii) also used to switch the EHF USB states after they have been synchronized to the internal clock and are stable.

In addition to transmitting data, the USB host may either SUSPEND or RESET the USB link. To detect this, the UPRx device has its pull-up activated in HSIDLE. When the host SUSPENDs the USB link, it will turn off the buffer that asserts SE0, and rely on pull-downs to maintain the SE0 state and the UPRXx pull-up can assert a "J" on the upstream USB link.

Step 2270 illustrates a state change from HSIDLE to FDSPLUS. UPTx device detects the "J" on the USB link (due to pull-up of UPRx after USB host turns off its buffer asserting SE0), and transitions to the FSDPLUS_1 state, and sends a EHF1 on the EHF link. DNRx sees EHF1 with the USB link at SE0 and moves to FSDPLUS_2 state from HSIDLE. This transition causes DNRx to set CP5 to 0. This, in turn, may cause DNTx to transition to FSDPLUS_3 state (after a period of persistent SE0, the USB device will also remove its FS driver (disable output) and enable the D+ pullup). DNTx now sends a EHF1, that is seen by the UPRx which transitions to FSDPLUS_4 and completes the EHF loop for this state transition.

Step 2272 illustrates an alternative to step 2270 where the EHF units transition from HSIDLE to HSRESET. If the USB host maintains a SE0 on its link, all EHF units continue to be in HSIDLE state. At a later time, the USB device can assert a ChirpK to start speed negotiation. DNTX will detect a ChirpK without change in ICC state and move to HSRESET_1 state. This triggers the conditions for all of the other EHF units to move to the HSRESET state.

Step 2274 illustrates a state transition from FSDPLUS to SUSPEND. After UPRx transitions to FSDPLUS_4, it switches the polarity of its ICC state. On detecting this (USB Idle and CP5 at 1), UPTx transitions to the SUSPEND_1 state and sends a EHF Idle, causing DNRx to transition to SUSPEND from FSDPLUS state. The state transition then progresses around the loop. When DNTx moves to USB SUSPEND state, the EHF link is set to idle state. In the SUSPEND state, the EHF transmitter is enters into a low power state. The DNRx maintains its pull-down resistors for low power SUSPEND. The devices exit the SUSPEND state and transition to the HSIDLE state when any of the inputs change. From HSIDLE, the state machines can return to high speed operation. If the SUSPEND state persists without any USB activity for greater than 100 ms, POC state machine will transition to data transport idle state to save power. When POC is in data transport idle state, the PI state machine can be held in SUSPEND state.

Step 2276 illustrates a state change from HSIDLE to HSRESET. When USB host processor forces SE0 for a minimum period of time (to enforce a USB reset), the USB device processor can acknowledge the USB Reset by sending a ChirpK that starts the high speed negotiation. DNTx responds to ChirpK by moving to HSRESET state first and sends an EHF1 to UPRx, which can transition to HSRESET_2 state because its USB port is still in SE0, and assert a ChirpK on the USB port. UPTx acknowledges the ChirpK and moves to HSRESET_3 state, and sends a EHF1 to DNRx. DNRx sees the EHF1 and the ChirpK on its USB port and moves to HSRESET_4 and changes the state of its CP5 pin.

At step 2278, DNTx sees the change in the CP5 state and moves to CHIRPK state first. This progresses around the loop to bring all the EHF units to CHIRPK state. When all four EHF units are in CHIRPK state, the High speed negotiation can continue as discussed above (e.g., steps 2254, 2256, and 2258).

Step 2280 illustrates another potential PI transition from HSIDLE. At step 2280, when a "K" is detected by either of the EHF Tx units, the Tx that first detects a "K" moves to the HSPEED_src state first. However, when UPTx first detects a "K" when CP5 is at 0, it saves the state until state machine transfers to HSPEEDsrc_9 or HSPEEDsrc_12.

It should be understood that although the steps of FIG. 22A-L are discussed with respect to system 1800 of FIG. 18, the PI state machine can be implemented in each of the EHF units of another system to enable data transport according to a USB 2.0 mode. For example, the USB 2.0 state machine can be implemented in a device that includes only one CCU that functions as both Tx and Rx.

It is to be understood that the steps shown in the flowcharts of one or more of FIGS. discussed here are merely illustrative and that existing steps may be modified or omitted, additional steps may be added, and the order of certain steps may be altered.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, the processes described with respect to FIGS. 1-22, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A contactless communications transmitter unit (CCTU) for use in establishing a contactless communications link with a first contactless communications receiver unit (CCRU) that is associated with a second USB device and for use in communicating with a second CCRU via at least one wired path, the contactless communication transmitter unit comprising:
   a plurality of pins, wherein at least a first pin is used to communicate with the second CCRU via a wired path and at least a second pin is used to communicate with a first Universal Serial Bus (USB) device;
   a transducer for transmitting extremely high frequency (EHF) contactless signals to the first CCRU;
   circuitry operative to:
      execute a CCTU state machine that tracks a state of the CCTU during the establishment of the contactless communications link, wherein the state machine transitions through a plurality of states in response to signals received by the first pin, wherein one of the plurality of states comprises a capabilities state for determining a data transfer protocol;
      execute a USB state machine during the capabilities state to enable the first USB device to establish a USB connection with the second USB device via the contactless communication link, wherein the USB state machine transitions through a plurality of USB states in response to signals received by the at least a first pin and the at least a second pin; and
      selectively transmit EHF signals, using the transducer, in response to a state transition in at least one of the CCTU state machine and the USB state machine.

2. The CCTU of claim 1, wherein the USB state machine relies on a propagation of states around an EHF loop to transition among USB states.

3. The CCTU of claim 2, wherein the EHF loop comprises the CCTU, the first CCRU, a second CCTU, and the second CCRU, wherein the CCTU and the second CCRU are associated with the first USB device and the second CCTU and the first CCRU are associated with the second USB device.

4. The CCTU of claim 1, wherein the USB state machine is a USB 2 state machine for establishing a USB 2 data transfer protocol.

5. The CCTU of claim 4, wherein the states of the USB 2 state machine are commensurate with states of a USB 2 standard.

6. The CCTU of claim 4, wherein the USB 2 state machines resolves whether to operate in one of a full speed mode and a high speed mode.

7. The CCTU of claim 1, wherein, in the capabilities state, the circuitry is operative to resolve which one of a plurality of USB data transport modes to use.

8. The CCTU of claim 7, wherein the USB state machine is based on the resolved USB data transport mode.

9. The CCTU of claim 7, wherein the plurality of USB data transport modes comprises USB 2, USB 3, and USB 3/2 Auto.

10. The CCTU of claim 7, wherein the circuitry is operative to determine whether the first USB controller is one of a host controller and a device controller.

11. The CCTU of claim 1, wherein the USB state machine is a USB 3 state machine for establishing a USB 3 data transfer protocol.

12. The CCTU of claim 11, wherein the states of the USB 3 state machine are commensurate with states of a USB 3 standard.

13. The CCTU of claim 12, wherein the states of the USB 3 state machine comprise PHY_OFF, Rx_Detect, Polling, U0, U1, U2, and U3.

14. A contactless communications receiver unit (CCRU) for use in establishing a contactless communications link with a first contactless communications transmitter unit (CCTU) and for use in communicating with at least a second CCTU via at least one wired path, the contactless communication receiver unit comprising:
   a plurality of pins, wherein at least a first pin is used to communicate with the second transmitter unit via a wired path and at least a second pin is used to communicate with a first Universal Serial Bus (USB) device;
   a transducer for receiving extremely high frequency (EHF) contactless signals from the first CCTU; and
   circuitry operative to:
      execute a CCRU state machine that tracks the state of the CCRU during the establishment of the contactless communications link, wherein the state machine transitions through a plurality of states in response to signals received by the transducer, wherein one of the plurality of states comprises a capabilities state for determining a data transfer protocol;

execute a USB state machine during the capabilities state to establish a USB connection with a second USB device associated with the first CCTU, wherein the USB state machine transitions through a plurality of USB states in response to signals received by the transducer; and selectively drive a signal on the first pin used to communicate with the second transmitter unit in response to a state transition in at least one of the CCRU state machine and the USB state machine.

15. The CCRU of claim 14, wherein the USB state machine relies on a propagation of states around an EHF loop to transition among USB states.

16. The CCRU of claim 14, wherein the EHF loop comprises the CCRU, the first CCTU, a second CCRU, and the second CCTU, wherein the CCRU and the second CCTU are associated with the first USB device and the second CCRU and the first CCTU are associated with the second USB device.

17. The CCRU of claim 14, wherein the USB state machine is a USB 2 state machine for establishing a USB 2 data transfer protocol.

18. The CCRU of claim 17, wherein the USB 2 state machine transitions through the plurality of USB states in response to signals received by the transducer and the at least a second pin.

19. The CCRU of claim 17, wherein the states of the USB 2 state machine are commensurate with states of a USB 2 standard.

20. The CCTU of claim 14, wherein, in the capabilities state, the circuitry is operative to resolve which one of a plurality of USB data transport modes to use.

21. The CCTU of claim 20, wherein the USB state machine is based on the resolved USB data transport mode.

22. The CCTU of claim 20, wherein the plurality of USB data transport modes comprises USB 2, USB 3, and USB 3/2 Auto.

23. The CCTU of claim 20, wherein the circuitry is operative to determine whether the first USB controller is one of a host controller and a device controller.

24. The CCTU of claim 14, wherein the USB state machine is a USB 3 state machine for establishing a USB 3 data transfer protocol.

25. The CCTU of claim 24, wherein the states of the USB 3 state machine are commensurate with states of a USB 3 standard.

26. The CCTU of claim 25, wherein the states of the USB 3 state machine comprise PHY_OFF, Rx_Detect, Polling, U0, U1, U2, and U3.

27. A first contactless communications unit (CCU) for use in establishing a contactless communications link with a second CCU that is associated with a second USB device, the first CCU comprising:

a plurality of pins, wherein at least a first pin is used to communicate with a first USB device;

a transducer for transmitting extremely high frequency (EHF) contactless signals to the second CCU and for receiving EHF contactless signals from the second CCU;

circuitry operative to:
execute a CCU state machine that tracks a state of the first CCU during the establishment of the contactless communications link, wherein the state machine transitions through a plurality of states in response to signals received by the second CCU, wherein one of the plurality of states comprises a capabilities state for determining a data transfer protocol;

execute a USB state machine during the capabilities state to enable the first USB device to establish a USB connection with the second USB device via the contactless communication link, wherein the USB state machine transitions through a plurality of USB states in response to signals received by the transducer and the at least a first pin; and selectively transmit and receive EHF signals, using the transducer, in response to a state transition in at least one of the CCU state machine and the USB state machine.

28. The CCU of claim 27, wherein the USB state machine relies on a propagation of states around an EHF loop to transition among USB states.

29. The CCU of claim 28, wherein the EHF loop comprises the first and second CCUs.

30. The CCU of claim 27, wherein the USB state machine is a USB 2 state machine for establishing a USB 2 data transfer protocol.

31. The CCTU of claim 30, wherein the states of the USB 2 state machine are commensurate with states of a USB 2 standard.

32. The CCTU of claim 30, wherein the USB 2 state machines resolves whether to operate in one of a full speed mode and a high speed mode.

* * * * *

UNITED STATES PATENT AND TRADEMARK OFFICE
CERTIFICATE OF CORRECTION

PATENT NO. : 9,940,295 B2
APPLICATION NO. : 14/826830
DATED : April 10, 2018
INVENTOR(S) : Isaac et al.

It is certified that error appears in the above-identified patent and that said Letters Patent is hereby corrected as shown below:

In the Drawings

On Sheet 8 of 32, for Box "1004", Line 2, delete "vender" and insert -- vendor --, therefor.

On Sheet 11 of 32, for Action "1", delete "Capabilties" and insert -- Capabilities --, therefor.

On Sheet 11 of 32, for Action "6", delete "Capabilties" and insert -- Capabilities --, therefor.

On Sheet 11 of 32, for Action "16", delete "Capabilties" and insert -- Capabilities --, therefor.

On Sheet 13 of 32, for Box "1510", Line 2, delete "EMF" and insert -- EHF --, therefor.

In the Specification

In Column 2, Lines 66-67, delete "embodiment." and insert -- embodiment; --, therefor.

In Column 15, Line 7, delete "fill-speed," and insert -- full-speed, --, therefor.

In Column 25, Line 30, delete "symbol" and insert -- symbol. --, therefor.

In Column 38, Line 57, delete "fill speed" and insert -- full speed --, therefor.

In the Claims

In Column 41, Line 61, Claim 1, delete "the state machine" and insert -- the CCTU state machine --, therefor.

In Column 42, Line 36, Claim 10, delete "controller" and insert -- device --, therefor.

Signed and Sealed this
Fifth Day of May, 2020

Andrei Iancu
*Director of the United States Patent and Trademark Office*

CERTIFICATE OF CORRECTION (continued)
U.S. Pat. No. 9,940,295 B2

In Column 42, Line 63, Claim 14, delete "the state machine" and insert -- the CCRU state machine --, therefor.

In Column 43, Line 14, Claim 16, delete "claim 14" and insert -- claim 15 --, therefor.

In Column 43, Line 39, Claim 23, delete "USB controller is" and insert -- USB device is --, therefor.

In Column 44, Line 10, Claim 27, delete "transducerfor" and insert -- transducer for --, therefor.

In Column 44, Line 40, Claim 31, delete "The CCTU" and insert -- The CCU --, therefor.

In Column 44, Line 43, Claim 32, delete "The CCTU" and insert -- The CCU --, therefor.